(12) United States Patent  
Tu et al.

(10) Patent No.: US 12,373,654 B2  
(45) Date of Patent: Jul. 29, 2025

(54) MODEL TRAINING METHOD, MACHINE TRANSLATION METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Zhaopeng Tu, Shenzhen (CN); Jian Li, Shenzhen (CN); Xing Wang, Shenzhen (CN); Longyue Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1053 days.

(21) Appl. No.: 17/199,333

(22) Filed: Mar. 11, 2021

(65) Prior Publication Data

US 2021/0201147 A1   Jul. 1, 2021

Related U.S. Application Data

(63) Continuation of application No. PCT/CN2019/120975, filed on Nov. 26, 2019.

(30) Foreign Application Priority Data

Nov. 28, 2018   (CN) .......................... 201811436794.0

(51) Int. Cl.
*G06F 40/44*     (2020.01)
*G06F 17/16*     (2006.01)
(Continued)

(52) U.S. Cl.
CPC .............. *G06F 40/44* (2020.01); *G06F 17/16* (2013.01); *G06F 18/2148* (2023.01);
(Continued)

(58) Field of Classification Search
CPC ..... G06F 17/16; G06F 18/2148; G06N 3/045; G06N 3/08
See application file for complete search history.

(56) References Cited

U.S. PATENT DOCUMENTS 11,775,311 B2 * 10/2023 Liu .................... G06N 3/063
2016/0314478 A1 * 10/2016 Krasnikov ............. G06N 3/049
(Continued)

FOREIGN PATENT DOCUMENTS

CN       106934413 A    7/2017
CN       107633225 A    1/2018
(Continued)

OTHER PUBLICATIONS

Vaswani, Ashish, et al. "Attention Is All You Need." 2017. (Year: 2017).*
(Continued)

*Primary Examiner* — Michelle T Bechtold
*Assistant Examiner* — Matiyas T Maru
(74) *Attorney, Agent, or Firm* — ANOVA LAW GROUP, PLLC

(57) ABSTRACT

Embodiments of this application disclose a neural network model training method, a machine translation method, a computer device, and a storage medium. The method includes: obtaining a training sample set including a training sample and a standard tag vector corresponding to the training sample; inputting the training sample into a neural network model including a plurality of attention networks to obtain a feature fusion vector; obtaining a predicted tag vector according to the feature fusion vector, and performing adjustment on a model parameter of the neural network model until a convergence condition is met to obtain a target neural network model.

16 Claims, 10 Drawing Sheets

(51) Int. Cl.
  *G06F 18/214* (2023.01)
  *G06N 3/045* (2023.01)
  *G06N 3/08* (2023.01)
  *G06V 10/764* (2022.01)
  *G06V 10/82* (2022.01)

(52) U.S. Cl.
  CPC ............... *G06N 3/045* (2023.01); *G06N 3/08* (2013.01); *G06V 10/764* (2022.01); *G06V 10/82* (2022.01)

(56) References Cited

U.S. PATENT DOCUMENTS

| | | | |
|---|---|---|---|
| 2019/0251952 A1* | 8/2019 | Arik | G06N 3/08 |
| 2020/0104729 A1* | 4/2020 | Busbridge | G06N 5/025 |
| 2020/0132491 A1* | 4/2020 | Zhang | G06N 3/084 |
| 2020/0342316 A1* | 10/2020 | Shazeer | G06N 3/08 |
| 2021/0406483 A1* | 12/2021 | Suzuki | G06F 40/20 |

FOREIGN PATENT DOCUMENTS

| | | | | |
|---|---|---|---|---|
| CN | 108416440 A | | 8/2018 | |
| CN | 109344391 A | * | 8/2018 | ............ G06N 3/045 |
| CN | 110162799 A | | 8/2019 | |

OTHER PUBLICATIONS

Xia, Yingce, et al. "Model-Level Dual Learning." 2018. (Year: 2018).*

Shen, Tao, et al. "Disan: Directional self-attention network for rnn/cnn-free language understanding." (Year: 2018).*

Zhang, Tingting, et al. "Feature-level deeper self-attention network for sequential recommendation." (Year: 2019).*

Zhang, Bill. "Google's neural machine translation system: Bridging the gap between human and machine translation." (Year: 2016).*

Vaswani, A. "Attention is all you need." (Year: 2017).*

Shen, et al. "Disan: Directional self-attention network for rnn/cnn-free language understanding." (Year: 2018).*

Fukui, et al. "Multimodal compact bilinear pooling for visual question answering and visual grounding." (Year: 2016).*

Kim, et al., "Bilinear attention networks." (Year: 2018).*

The Japan Patent Office (JPO) Notification of Reasons for Refusal for Application No. 2021-505689 and Translation Apr. 26, 2022 25 Pages.

Ashish Vaswani et al., "Attention Is All You Need," arXiv:1706.03762v5, Dec. 6, 2017. 15 pages.

Makoto Marishita et al., "Improving Neural Machine Translation by Incorporating Hierarchical Subword Features," The 32nd Annual Conference of the Japanese Society for Artificial Intelligence, Jun. 5, 2018, https://www.istage.jst.go.jp/article/pjsai/JSAI2018/0/JSAI2018_4Pin109/_article/-char/ja/. 4 pages.

Aurelien Geron, "Practical machine learning with scikit-learn and TensorFlow," O'Reilly Japan, First edition, Apr. 26, 2018, p. 268, 381-412. 48 pages.

Takeshi Fujita, "Deep Learning with C++," Mynavi Publishing Co., Ltd., First edition, Jun. 25, 2017. 14 pages.

The World Intellectual Property Organization (WIPO) International Search Report for PCT/CN2019/120975 Mar. 4, 2020 5 Pages (including translation).

Ashish Vaswani et al., "Attention is All You Need," In Proceedings of Conference on Neural Information Processing Systems (NIPS 2017), arXiv:1706.0376, Dec.6, 2017. 15 pages.

Tao Shen et al., "DiSAN: Directional Self-Attention Network for RNN/CNN free Language Understanding," In Proceedings of AAAI 2018. 10 pages.

Karim Ahmed al., "Weighted Transformer Network for Machine Translation," In arXiv preprint arXiv:1711.02132, Nov. 6, 2017. 10 pages.

Biao Zhang et al., "Shallow Convolutional Neural Network for Implicit Discourse Relation Recognition," In Proceedings of EMNLP 2015, pp. 2230-2235. 6 pages.

Jin-Hwa Kim et al., "Hadamard Product For Low-Rank Bilinear Pooling," In Proceedings of ICLR 2017, arXiv:1610.04325, Mar. 26, 2017. 14 pages.

\* cited by examiner

MODEL TRAINING METHOD, MACHINE TRANSLATION METHOD, COMPUTER DEVICE, AND STORAGE MEDIUM

RELATED APPLICATIONS

This application claims priority to PCT Application No. PCT/CN2019/120975, filed on Nov. 26, 2019, which in turn claims priority to Chinese Patent Application No. 201811436794.0, entitled "MODEL TRAINING METHOD, MACHINE TRANSLATION METHOD, RELATED APPARATUS, AND DEVICE" and filed with the National Intellectual Property Administration, PRC on Nov. 28, 2018. Both applications are incorporated herein by reference in their entirety.

FIELD OF THE TECHNOLOGY

This application relates to the field of computer technologies, and in particular, to a training method for a neural network model, a machine translation method, a computer device, and a computer-readable storage medium.

BACKGROUND OF THE DISCLOSURE

In recent years, an attention mechanism is widely applied to various tasks in the field of deep learning-based natural language processing (NLP), such as tasks of machine translation, intelligent question-answering, and speech recognition.

SUMMARY

Embodiments of this application provide a neural network model training method, to ensure that a trained neural network model is capable of performing full interaction on respective output vectors of a plurality of attention networks and learn a feature including more information, thereby enhancing a model learning representation capability.

According to a first aspect, an embodiment of this application provides a neural network model training method. The method includes obtaining a training sample set, the training sample set comprising a training sample and a standard tag vector corresponding to the training sample: inputting the training sample into a plurality of attention networks of a neural network model, and performing nonlinear transformation on respective output vectors of the plurality of attention networks by using the neural network model: obtaining a feature fusion vector corresponding to the plurality of attention networks: obtaining a predicted tag vector outputted by the neural network model according to the feature fusion vector, the predicted tag vector corresponding to the training sample; and performing iteration adjustment on a model parameter of the neural network model according to a result of a comparison between the predicted tag vector and the standard tag vector corresponding to the training sample; and in response to the neural network model meeting a convergence condition, identifying a target neural network model.

According to a second aspect, an embodiment of this application provides a machine translation method, including: obtaining to-be-translated content, obtaining a translation result corresponding to the to-be-translated content by using a machine translation model, the machine translation model being obtained by performing training according to the model training method, and displaying the translation result. The obtaining a translation result corresponding to the to-be-translated content by using a machine translation model, the machine translation model being obtained by performing training according to the model training method includes obtaining a training sample set, the training sample set comprising a training sample and a standard tag vector corresponding to the training sample: inputting the training sample into a plurality of attention networks of the machine translation model, and performing nonlinear transformation on respective output vectors of the plurality of attention networks: obtaining a feature fusion vector corresponding to the plurality of attention networks: obtaining a predicted tag vector outputted by the machine translation model according to the feature fusion vector, the predicted tag vector corresponding to the training sample: performing iteration adjustment on a model parameter of the machine translation model according to a result of a comparison between the predicted tag vector and the standard tag vector corresponding to the training sample; and in response to the neural network model meeting a convergence condition, identifying the machine translation model.

According to a third aspect, an embodiment of this application provides a computer device, including a processor and a memory: the memory being configured to store program code executable by the processor; and the processor being configured to execute the program code and perform a plurality of operations comprising: obtaining a training sample set, the training sample set comprising a training sample and a standard tag vector corresponding to the training sample: inputting the training sample in the training sample set into a plurality of attention networks of a neural network model, and performing nonlinear transformation on respective output vectors of the plurality of attention networks by using the neural network model, to obtain a feature fusion vector corresponding to the plurality of attention networks: obtaining a predicted tag vector outputted by the neural network model according to the feature fusion vector, the predicted tag vector corresponding to the training sample; and performing iteration adjustment on a model parameter of the neural network model according to a result of comparison between the predicted tag vector corresponding to the training sample and the standard tag vector: in response to the neural network model meeting a convergence condition, identifying a target neural network model.

The embodiments of this application provide a neural network model training method. A training sample set includes a training sample and a standard tag vector corresponding to the training sample is first obtained: the training sample in the training sample set is then inputted into a neural network model, the neural network model including a plurality of attention networks: subsequently, nonlinear transformation is performed on respective output vectors of the plurality of attention networks by using the neural network model, to obtain a feature fusion vector corresponding to the plurality of attention networks; and a predicted tag vector that corresponds to the training sample and that is outputted by the neural network model according to the feature fusion vector is obtained, and a model parameter of the neural network model is adjusted according to a result of comparison between the predicted tag vector and the standard tag vector, until a convergence condition is met, to obtain a target neural network model. In the training method, when the respective output vectors of the plurality of attention networks are fused, the respective output vectors of the plurality of attention networks are fused in a nonlinear transformation method to obtain the feature fusion vector. Compared with the related art in which the respective output vectors of the plurality of attention networks are spliced to obtain the feature fusion vector, a complex relationship between the output vectors of the attention networks is considered in the nonlinear transformation method, so that the respective output vectors of the attention networks can be fully interacted, to generate the feature fusion vector with more information amount, thereby ensuring a better final output representation effect. Therefore, a neural network model obtained through training based on the training method has a stronger learning capability.

DESCRIPTION OF EMBODIMENTS

Figure 1:
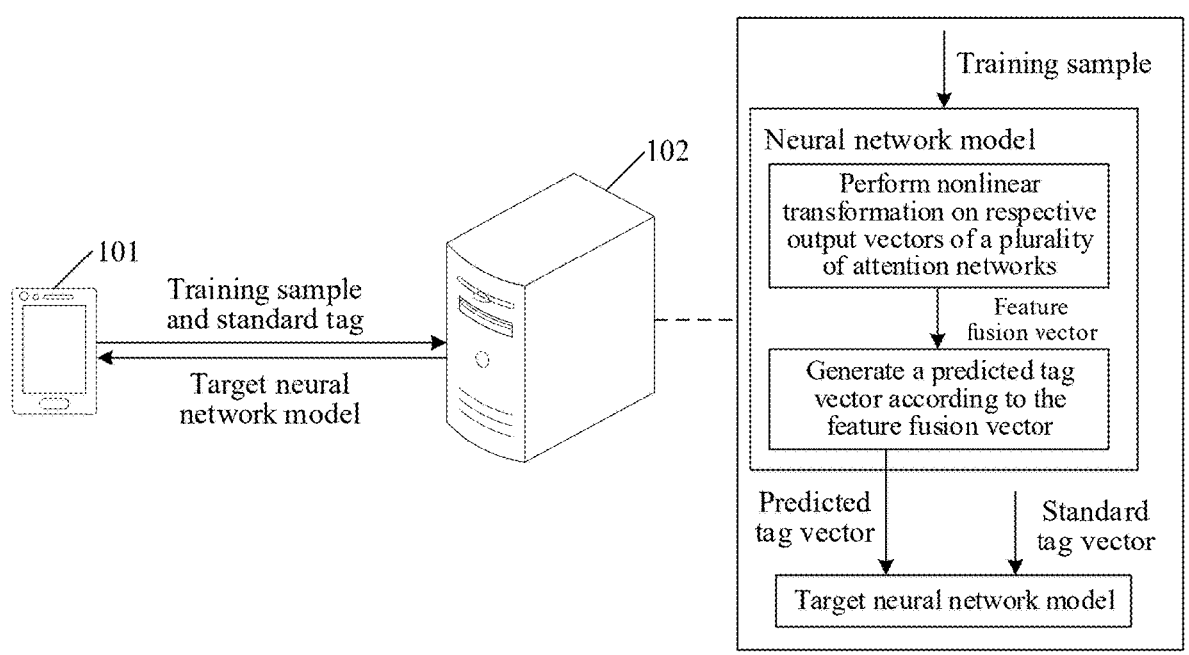
FIG. 1 is a schematic diagram of an application scenario of a neural network model training method according to an embodiment of this application.

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

In the specification, claims, and accompanying drawings of this application, the terms "first", "second", "third", "fourth", and so on (if existing) are intended to distinguish between similar objects rather than describe a specific order or sequence. It is to be understood that the data termed in such a way are interchangeable in proper circumstances, so that the embodiments of this application described herein can be implemented in other orders than the order illustrated or described herein. Moreover, the terms "include", "have" and any other variants thereof mean to cover the non-exclusive inclusion. For example, a process, method, system, product, or device that includes a list of steps or units is not necessarily limited to those clearly listed steps or units, but may include other steps or units that are not clearly listed or inherent to such a process, method, system, product, or device.

In the related art, in a process of training a model based on a multi-headed attention mechanism, respective output vectors of a plurality of attention networks in the model are directly spliced in a linear splicing method, to obtain a feature fusion vector corresponding to the plurality of attention networks. However, such a linear splicing method, which is an insufficient feature fusion mechanism, cannot effectively perform modeling on a complex relationship between subspaces and cannot extract a complementary relationship between features.

To resolve a problem in the foregoing related art, embodiments of this application provide a neural network model training method, to ensure that a trained neural network model can perform full interaction on respective output vectors of a plurality of attention networks, thereby generating a final replaced output representation.

The following describes a core technology idea of the neural network model training method provided in the embodiments of this application. The multi-headed attention mechanism refers to learning different features by using a plurality of attention networks, that is, to capture related information in different subspaces through calculation for a plurality of times.

Embodiments of the present disclosure provide a neural network model training method. A training sample set is first obtained, a training sample set including a training sample and a standard tag vector corresponding to the training sample. The training sample in the training sample set is then inputted into a neural network model, the neural network model including a plurality of attention networks, that is, the training sample in the training sample set is inputted into the plurality of attention networks of the neural network model. Subsequently, nonlinear transformation is performed on respective output vectors of the plurality of attention networks by using the neural network model, to obtain a feature fusion vector corresponding to the plurality of attention networks. A predicted tag vector outputted by the neural network model according to the feature fusion vector is obtained, the predicted tag vector corresponding to the training sample, and iteration adjustment is performed on a model parameter of the neural network model according to a result of comparison between the predicted tag vector corresponding to the training sample and the standard tag vector, until a convergence condition is met, to obtain a target neural network model.

In the neural network model training method, when the respective output vectors of the plurality of attention networks are fused by using the neural network model, the respective output vectors of the attention networks are fused in a nonlinear transformation method to obtain the feature fusion vector. Compared with the related art in which linear splicing is performed on the respective output vectors of the attention networks to obtain the feature fusion vector, a complex relationship between the output vectors of the attention networks is considered in the nonlinear transformation method, so that the output vectors of the attention networks can be fully interacted, to generate the feature fusion vector with more information amount, thereby ensuring a better final output representation effect.

An attention mechanism-based neural network model is used in various application scenarios. For example, these applications include machine translation, image annotation, intelligent question-answering, and speech recognition. When a neural network model capable of implementing a specific function needs to be developed for an application scenario, related data in the application scenario may be obtained as a training sample set, and the neural network model applicable to the application scenario is trained correspondingly by using the training sample set by using the neural network model training method provided in the embodiments of this application.

The neural network model training method provided in the embodiments of this application may be applicable to a device having a model training function, for example, a computer device, a terminal device, or a server. The terminal device may specifically be a smartphone, a computer, a personal digital assistant (PDA), a tablet computer, or the like, and the server may specifically be an application server, or may be a web server. In some embodiments, the server may be an independent server, or may be a cluster server.

In some embodiments, the terminal device and the server may train a neural network model separately, or may interact with each other to train a neural network model. When the terminal device and the server interactively train the neural network model, the terminal device may obtain a training sample set from the server and train the neural network model by using the training sample set, or the server may obtain a training sample set from the terminal device and train the neural network model by using the training sample set.

After performing the neural network model training method provided in the embodiments of this application and obtaining a target neural network model through training, the terminal device or the server may send the target neural network model to other terminal devices, to run the target neural network model on the terminal devices and implement a corresponding function, or may send the target neural network model to other servers, to run the target neural network model on the servers and implement a corresponding function through the servers.

For ease of understanding of the technical solutions provided in the embodiments of this application, that the server trains a neural network model is used as an example below, and the neural network model training method provided in the embodiments of this application is described with reference to an actual use scenario.

FIG. 1 is a schematic diagram of an application scenario of a neural network model training method according to an embodiment of this application. The scenario includes a terminal device 101 and a server 102 for training a neural network model, the terminal device 101 is connected to the server 102 through a network, and the network may be a wired network or a wireless network. The terminal device 101 is capable of providing training samples and standard tags corresponding to the training samples for the server.

After obtaining the training samples and the standard tags corresponding to the training samples from the terminal device 101 through the network, the server 102 correspondingly converts the standard tags into standard tag vectors, and the server 102 uses all the obtained training samples and the standard tag vectors corresponding to the training samples as a training sample set, and then inputs the training sample set into a neural network model, the neural network model including a plurality of attention networks, that is, inputs the training sample set into the plurality of attention networks of the neural network model: the server 102 performs nonlinear transformation on respective output vectors of the plurality of attention networks by using the neural network model, to obtain a feature fusion vector corresponding to the plurality of attention networks, and obtains predicted tag vectors outputted by the neural network model according to the feature fusion vector, the predicted tag vectors corresponding to the training samples; and finally, the server 102 performs iteration adjustment on a model parameter of the neural network model according to a result of comparison between the standard tag vectors and the predicted tag vectors that correspond to the training samples, until the neural network model meets a convergence condition, to obtain a target neural network model.

After generating the target neural network model, the server 102 may further send the target neural network model to the terminal device 101, to run the target neural network model on the terminal device and implement a corresponding function by using the target neural network models.

In the process of training the neural network model, the server 102 fuses the respective output vectors of the attention networks in a nonlinear transformation method. In such a method of fusing the output vectors through nonlinear transformation, a complex relationship between the output vectors of the attention networks is considered, so that the output vectors of the attention networks can be fully interacted, to generate the feature fusion vector with more information amount, thereby ensuring a better final output representation effect.

The application scenario shown in FIG. 1 is only an example. In some embodiments, the neural network model training method provided in the embodiments of this application may further be applicable to another application scenario, and an application scenario of the neural network model training method is not limited herein.

The following describes, through embodiments, the neural network model training method provided in this application.

Figure 2:
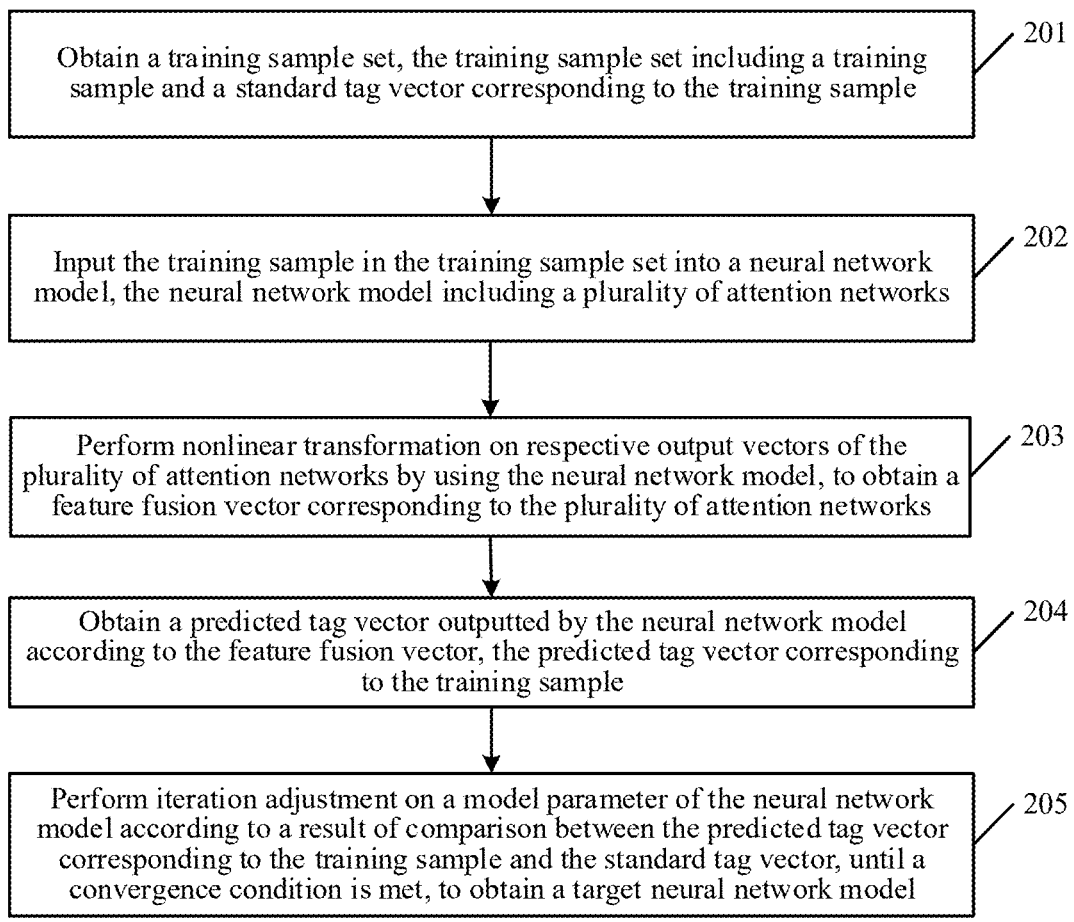
FIG. 2 is a schematic flowchart of a neural network model training method according to an embodiment of this application.

FIG. 2 is a schematic flowchart of a neural network model training method according to an embodiment of this application. For ease of description, in the following embodiment, description is made by using a server as an execution body. It is to be understood that the execution body of the neural network model training method is not limited only to a server, but also may be applied to a device having a model training function such as a terminal device. As shown in FIG. 2, the neural network model training method includes the following steps.

Step 201. A server obtains a training sample set, the training sample set including a training sample and a standard tag vector corresponding to the training sample.

The server obtains a training sample set, to train a neural network model by using a training sample in the training sample set. The training sample set usually includes a plurality of training samples and standard tag vectors corresponding to the training samples, and the standard tag vector is generated according to a standard tag corresponding to the training sample.

In some embodiments, the server may obtain a plurality of pieces of historical data from a related database and use the obtained plurality of pieces of historical data as a training sample set. It is to be understood that when the execution body of the neural network model training method provided in the embodiments of this application is the terminal device, the terminal device may initiate a request of obtaining historical data to the server and obtain a plurality of pieces of historical data from the server as the training sample set.

In some embodiments, the training sample includes, but not limited to, at least one of a to-be-translated text, a to-be-translated video, or to-be-translated audio, and a standard tag corresponding to the training sample is a standard translated text.

When a training sample is the to-be-translated text, a standard tag corresponding to the training sample is a standard translated text corresponding to the to-be-translated text. If a to-be-translated text used as a training sample is Chinese, and the to-be-translated text needs to be translated into corresponding English, a standard tag corresponding to the training sample is an English standard translated text. For example, if a to-be-translated text used as a training sample is Chinese "我爱你", a standard tag corresponding to the training sample is "I love you". If a to-be-translated text used as a training sample is English, and the to-be-translated text needs to be translated into corresponding Chinese, a standard tag corresponding to the training sample is a Chinese standard translated text. For example, if a to-be-translated text used as a training sample is English "I love you", a standard tag corresponding to the training sample is "我爱你".

When a training sample is the to-be-translated video, the training sample is usually applied to an application scenario of image annotation, a standard tag corresponding to the training sample is a standard translated text, and the standard translated text is text information corresponding to a scenario presented by the to-be-translated video. For example, if a scenario presented by a to-be-translated video used as a training sample is that a teacher is teaching students in a classroom, a standard tag corresponding to the training sample is "a teacher is in a classroom". It is to be understood that the to-be-translated video herein may be a static video frame, or may be a dynamic video frame.

When a training sample is the to-be-translated audio, a standard tag corresponding to the training sample is still a standard translated text, and the standard translated text is text information corresponding to the to-be-translated audio. For example, if to-be-translated audio used as a training sample is that "我很好, 谢谢", correspondingly, a standard tag corresponding to the training sample may be that "我很好, 谢谢" or "I am fine, thank you", and the standard tag may be determined according to a specific function to be implemented by the neural network model.

The training sample and the tag corresponding to the training sample are merely examples. In some embodiments, another data may further be acquired as a training sample, a standard tag corresponding to the training sample is obtained, and a standard tag vector corresponding to the training sample is further determined according to the standard tag.

The training sample is usually formed by a group of sequentially arranged elements, that is, the training sample may be represented as an element sequence. A training sample including I elements is used as an example, the training sample may be represented as $X=\{x_1, x_2, x_3, \ldots, x_I\}$, and a length of the training sample is I. For example, if a to-be-translated text used as a training sample is "今天是星期一", correspondingly, the training sample may be represented as {今, 天, 是, 星, 期, 一}. In another example, if a to-be-translated text used as a training sample is "Today is Monday", correspondingly, the training sample may be represented as {Today, is, Monday}.

Step 202. The server inputs the training sample in the training sample set into a neural network model, the neural network model including a plurality of attention networks.

After obtaining the training sample set, the server inputs samples in the training sample set into the neural network model one by one, that is, inputs the training samples in the training sample set into the plurality of attention networks of the neural network model one by one, to train the neural network model by using the training samples in the training sample set. The neural network model is a pre-established network model and includes a plurality of attention networks, and the plurality of attention networks are networks for capturing different feature information.

The neural network model may be a neural network model such as a recurrent neural network (RNN) model, a neural machine translation (NMT) model, or an encoder-decoder. A structure of the neural network model is not specifically limited herein.

The attention networks respectively correspond to different subspaces, that is, the subspace and the attention network are in a one-to-one correspondence relationship. The subspaces correspondingly perform an attention function operation on an inputted element sequence, and output a corresponding query vector sequence, key vector sequence, and value vector sequence. The attention function may specifically be linear transformation, the linear transformation may be mapping a vector that belongs to one vector space to another vector space, and the vector space is a set formed by a plurality of vectors of the same dimension.

During specific implementation, after the server inputs the training sample in the training sample set into the neural network model, the neural network model may convert an element sequence corresponding to the training sample into a corresponding source vector sequence by using a first-layer network structure in the neural network model, that is, convert discrete elements into a continuous spatial representation. The source vector sequence is formed by a source vector corresponding to each element in the element sequence corresponding to the training sample, and the source vector sequence may be represented as $Z=\{z_1, z_2, z_3, \ldots, z_I\}$. For example, the first-layer network structure of the neural network model converts an $i^{th}$ element $x_i$ in the element sequence corresponding to the training sample into a d-dimensional column vector $z_i$, and combines the column vectors corresponding to elements in the element sequence, to obtain a source vector sequence corresponding to the training sample, and the source vector sequence is a vector sequence formed by I d-dimensional column vectors.

In one embodiment, after the neural network model converts a training sample into a source vector sequence corresponding to the training sample, the attention networks in the neural network model may separately map the source vector sequence into different subspaces, and perform the attention function operation on the source vector sequence by using the subspaces, to obtain a query vector sequence, key vector sequence, and value vector sequence that correspond to the source vector sequence. Assuming that the attention networks include i subspaces, and the subspaces include three different learnable parameter matrixes $W_i^Q$, $W_i^K$, and $W_i^V$, linear transformation is performed on the source vector sequence by using the three learnable parameter matrixes, to obtain a query vector sequence $Q_i$, a key vector sequence $K_i$, and a value vector sequence $V_i$. A specific linear transformation process is as follows:

$$Q_i = z_i * W_i^Q$$

$$K_i = z_i * W_i^K$$

$$V_i = z_i * W_i^V$$

The query vector sequence Q, the key vector sequence K, and the value vector sequence V outputted by an $i^{th}$ subspace are respectively $Q_i$, $K_i$, and $V_i$. The training sample $X=\{x_1, x_2, x_3, \ldots, x_I\}$ includes I elements, and elements in the source vector sequence $Z=\{z_1, z_2, z_3, \ldots, z_I\}$ are d-dimensional column vectors, that is, Z is a vector sequence formed by I d-dimensional column vectors, which may be denoted by a matrix of I*d. The learnable parameter matrixes $W_i^Q$, $W_i^K$, and $W_i^V$ are matrixes of d*d, and the query vector sequence Q, the key vector sequence K, and the value vector sequence V are matrixes of I*d. I or d is any positive integer greater than or equal to 1.

In another embodiment, after the neural network model converts the training sample into the source vector sequence corresponding to the training sample, the neural network model first performs the linear transformation on the source vector sequence Z by using the three different learnable parameter matrixes $W_i^Q$, $W_i^K$, and $W_i^V$ to obtain a query vector basic sequence q, a key vector basic sequence k, and a value vector basic sequence v. A specific linear transformation process is as follows:

$$q = Z * W^Q$$

$$k = Z * W^K$$

$$v = Z * W^V$$

The training sample $X=\{x_1, x_2, x_3, \ldots, x_I\}$ includes I elements, and elements in the source vector sequence $Z=\{z_1, z_2, z_3, \ldots, z_I\}$ are d-dimensional column vectors, that is, Z is a vector sequence formed by I d-dimensional column vectors, which may be denoted by a matrix of I*d. The learnable parameter matrixes $W_i^Q$, $W_i^K$, and $W_i^V$ are matrixes of d*d, and the query vector basic sequence q, the key vector basic sequence k, and the value vector basic sequence v are matrixes of I*d. I or d is any positive integer greater than or equal to 1.

The attention networks in the neural network model then separately map the query vector basic sequence q, the key vector basic sequence k, and the value vector basic sequence v to the subspaces, and perform the attention function operation on the query vector basic sequence q, the key vector basic sequence k, and the value vector basic sequence v by using the subspaces, to obtain the corresponding query vector sequence Q, key vector sequence K, and value vector sequence V. A specific calculation process is as follows:

$$Q_i = q * W_i^Q$$

$$K_i = k * W_i^K$$

$$V_i = v * W_i^V$$

The query vector sequence Q, the key vector sequence K, and the value vector sequence V outputted by the $i^{th}$ subspace are respectively $Q_i$, $K_i$, and $V_i$, and the learnable parameter matrixes $W_i^Q$, $W_i^K$, and $W_i^V$ of the subspaces are different.

After the query vector sequences, the key vector sequences, and the value vector sequences that correspond to the subspaces are obtained, a logic similarity between a query and each key-value pair may be modeled separately by using a dot product in the subspaces. A specific formula for calculating the logic similarity e is as follows:

$$e_i = \frac{Q_i \cdot K_i^T}{\sqrt{d}}$$

where ea is a logic similarity corresponding to an $i^{th}$ subspace, $K_i^T$ is a transposition of a key vector sequence $K_i$ of the $i^{th}$ subspace, $Q_i$ is a query vector sequence of the $i^{th}$ subspace, and d is a dimension of a hidden state vector of the neural network model. d is a fixed parameter, and i or d is any positive integer greater than or equal to 1.

Subsequently, softmax nonlinear transformation is performed on the logic similarity obtained by calculating the dot product, and the logic similarity is converted into a weight relationship between the query and each key-value pair. A specific formula for converting the logic similarity into the weight relationship is as follows:

$$\alpha_i = \text{soft max}(e_i)$$

where $\alpha_i$ is a weight relationship corresponding to the $i^{th}$ subspace, $e_i$ is the logic similarity corresponding to the $i^{th}$ subspace, and a softmax function is a softmax function.

Then, weighted processing is performed on the value vector sequences corresponding to the subspaces correspondingly by using the weight relationship obtained through calculation, to obtain respective output vectors corresponding to the subspaces, and the output vector is an output vector of the attention network. A specific weighting processing formula is as follows:

$$O_i = \alpha_i \cdot V_i$$

where $O_i$ is an output vector corresponding to the $i^{th}$ subspace, that is, an output vector corresponding to an $i^{th}$ attention network, $\alpha_i$ is the weight relationship corresponding to the $i^{th}$ subspace, $V_i$ is a value vector sequence corresponding to the $i^{th}$ subspace, and i is any positive integer greater than or equal to 1.

Step 203. The server performs nonlinear transformation on respective output vectors of the plurality of attention networks by using the neural network model, to obtain a feature fusion vector corresponding to the plurality of attention networks.

After obtaining respective corresponding output vectors of the attention networks, the neural network model further performs the nonlinear transformation on the respective output vectors of the attention networks, so that the output vectors of the attention networks are fully interacted through the nonlinear transformation, to obtain a feature fusion vector with more information amount.

In this application, from perspectives in which a structure is simple and easy for modeling, additional compute resources are reduced as far as possible, and the like, three nonlinear transformation methods are mainly provided to fuse the respective output vectors of the plurality of attention networks and are respectively that: convolution is applied to perform feature fusion on the respective output vectors of the plurality of attention networks, a bilinear model is applied to perform feature fusion on the respective output vectors of the plurality of attention networks, and both a bilinear model and vector splicing are applied to perform feature fusion on the respective output vectors of the plurality of attention networks. The following specifically describes the three nonlinear transformation methods in subsequent embodiments.

In some embodiments, the respective output vectors of the plurality of attention networks may also be fused by using another nonlinear transformation method, to obtain the feature fusion vector, and a nonlinear transformation method that can be used is not specifically limited herein.

Step 204. The server obtains a predicted tag vector outputted by the neural network model according to the feature fusion vector, the predicted tag vector corresponding to the training sample.

After obtaining the feature fusion vector corresponding to the plurality of attention networks by using the neural network model, the server further performs corresponding processing on the feature fusion vector by using the neural network model, to generate the predicted tag vector corresponding to the training sample according to the feature fusion vector, and the predicted tag vector is further converted to obtain a predicted tag.

The predicted tag and the standard tag are data of the same type. For example, if the standard tag is a standard translated Chinese text corresponding to a training sample, the predicted tag is a Chinese text obtained after a series of processing is performed on the training sample by the neural network model. Correspondingly, data types of the predicted tag vector and the standard tag vector are of the same type, and therefore, the predicted tag vector and the standard tag vector may be compared with each other.

Step 205. The server performs iteration adjustment on a model parameter of the neural network model according to a result of comparison between the predicted tag vector corresponding to the training sample and the standard tag vector, until a convergence condition is met, to obtain a target neural network model.

After obtaining the predicted tag vector outputted by the neural network model, the server further compares the predicted tag vector corresponding to the training sample with the standard tag vector corresponding to the training sample, determines a result of comparison between the predicted tag vector and the standard tag vector, and performs the iteration adjustment on the model parameter of the neural network model according to the result of comparison. The iteration adjustment is performed on the model parameter, so that the neural network model gradually tends to converge. That is, performance of the neural network model is gradually optimized. When the neural network model meets the convergence condition, that is, when the performance of the neural network model reaches a preset standard, the target neural network model may be determined according to a model structure and a model parameter of the current neural network model.

Specifically, when the model parameter of the neural network model is adjusted, the server may determine a loss function according to the result of comparison between the predicted tag vector corresponding to the training sample and the standard tag vector corresponding to the training sample; perform the iteration adjustment on the model parameter of the neural network model with the goal of minimizing the loss function; and when the loss function is minimized, determine that the current neural network model meets the convergence condition and use the current neural network model as the target neural network model.

In the process of adjusting the parameter, in other words, the server may determine a loss function value according to the result of comparison between the predicted tag vector corresponding to the training sample and the standard tag vector corresponding to the training sample; perform the iteration adjustment on the model parameter of the neural network model in a case that the loss function value is greater than a target threshold; and when the loss function value is less than or equal to the target threshold, determined that the current neural network model meets the convergence condition and use the current neural network model as the target neural network model. The target threshold is any value greater than or equal to 0 and less than or equal to 1.

Specifically, when it is determined whether the neural network model meets the convergence condition, verification may be performed on a first model by using a test sample, and the first model is a model obtained by performing a first round of training and optimization on the neural network model by using the training sample in the training sample set. Specifically, the server inputs the test sample into the first model, and performs corresponding processing on the test sample by using the first model. During processing, the first model performs nonlinear transformation on the respective output vectors of the plurality of attention networks, to obtain a feature fusion vector corresponding to the plurality of attention networks, generates a predicted tag vector corresponding to the test sample according to the feature fusion vector, and calculates predicted accuracy according to the predicted tag vector and a standard tag vector corresponding to the test sample. When the predicted accuracy is greater than a first preset threshold, it may be considered that the first model meets the convergence condition. In this case, the model has relatively good performance and can meet an actual requirement. Correspondingly, the target neural network model may be generated according to a model parameter and a model structure of the first model.

In addition, when it is determined whether the neural network model meets the convergence condition, whether to continue to train the neural network model may further be determined according to a plurality of models obtained through a plurality of rounds of training, to obtain the neural network model with the best model performance. Specifically, verification may be separately performed on a plurality of neural network models obtained through a plurality of rounds of training by using the test sample, and it is determined whether a difference between predicted accuracy of the neural network models obtained through the plurality of rounds of training is less than a second preset threshold. If the difference is less than the second preset threshold, it is considered that there is no room for improving the performance of the neural network model, and the neural network model with the highest predicted accuracy may be selected as the target neural network model; otherwise, if the difference is greater than the second preset threshold, it is considered that there is still room for improving the performance of the neural network model, and the neural network model may continue to be trained until the neural network model with the most stable and optimal model performance is obtained.

Both the first preset threshold and the second preset threshold may be set according to actual situations. Values of the first preset threshold and the second preset threshold are not specifically limited herein.

In the neural network model training method, when the respective output vectors of the plurality of attention networks are fused by using the neural network model, the respective output vectors of the attention networks are fused in a nonlinear transformation method to obtain the feature fusion vector. Compared with the related art in which linear splicing is performed on the respective output vectors of the attention networks to obtain the feature fusion vector, a complex relationship between the output vectors of the attention networks is considered in the nonlinear transformation method, so that the output vectors of the attention networks can be fully interacted, to generate the feature fusion vector with more information amount, thereby ensuring a better final output representation effect.

As mentioned in the embodiment, according to the neural network model training method provided in the embodiments of this application, respective output vectors of a plurality of attention networks are fused into a corresponding feature fusion vector in a nonlinear transformation method, and this application mainly provides three nonlinear transformation methods: First, convolution is applied to perform feature fusion on a feature map formed by the respective output vectors of the plurality of attention networks. Second, a bilinear model is applied to perform feature fusion on the respective output vectors of the plurality of attention networks. Third, both a bilinear model and vector splicing are applied to perform feature fusion on the respective output vectors of the plurality of attention networks. The following specifically describes the three nonlinear transformation methods separately through embodiments.

Figure 3:
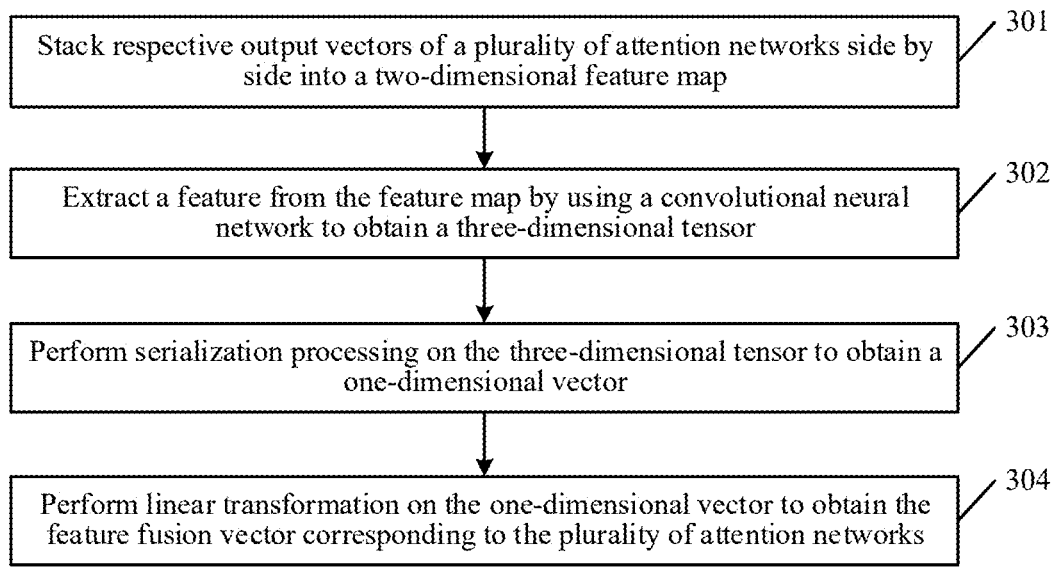
FIG. 3 is a schematic flowchart of a nonlinear transformation method according to an embodiment of this application.

First, the first nonlinear transformation method (that is, the convolution is applied to perform the feature fusion on the feature map formed by the respective output vectors of the plurality of attention networks) is specifically described. FIG. 3 is a schematic flowchart corresponding to the nonlinear transformation method. As shown in FIG. 3, the method includes the following steps.

Step 301. A server stacks respective output vectors of a plurality of attention networks side by side into a two-dimensional feature map.

In this embodiment of this application, one two-dimensional feature map is used as an example for description, and there may be one or more two-dimensional feature maps. The number of feature maps is not specifically limited in this embodiment of this application.

Figure 4:
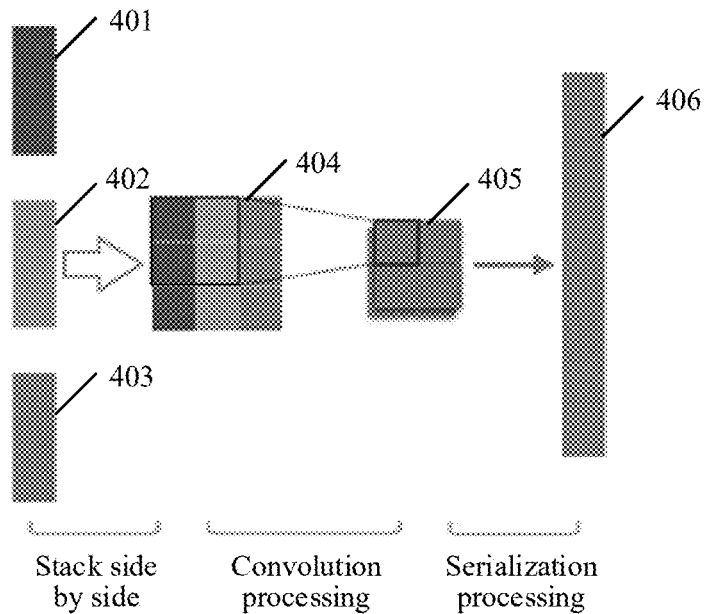
FIG. 4 is a schematic diagram of a nonlinear transformation method according to an embodiment of this application.

After obtaining respective output vectors of a plurality of attention networks, the neural network model stacks the output vectors side by side, to obtain a two-dimensional feature map. For ease of understanding, the following describes an implementation process of steps in this embodiment with reference to FIG. 4. FIG. 4 is a schematic diagram corresponding to the nonlinear transformation method. As shown in FIGS. 4, 401, 402, and 403 are output vectors of attention networks. In step 301, the neural network model stacks the output vector 401, the output vector 402, and the output vector 403 into a two-dimensional feature map 404 in a side-by-side stacked method.

It is to be understood that FIG. 4 is only an example. In some embodiments, the number of attention networks included in the neural network model is not limited to three, and correspondingly, the number of output vectors corresponding to the attention networks is also not limited to three. That is, in some embodiments, the neural network model may stack a plurality of output vectors into a two-dimensional feature map in the side-by-side stacked method. The number of output vectors is not limited herein.

Step 302. The server extracts a feature from the feature map by using a convolutional neural network to obtain a three-dimensional tensor.

Further, the neural network model performs, by using a convolutional neural network, feature extraction on the two-dimensional feature map obtained from the side-by-side stacked output vectors, to obtain a three-dimensional tensor corresponding to the feature map. As shown in FIG. 4, the neural network model performs convolution processing on the two-dimensional feature map 404 formed by the output vectors stacked side by side and extracts a feature of the two-dimensional feature map 404, to obtain a three-dimensional tensor 405.

In one embodiment, the neural network model may perform a convolution operation on the feature map by using the convolutional neural network to obtain the three-dimensional tensor. The convolutional neural network is a feed-forward neural network, an artificial neuron in the convolutional neural network may correspond to a surrounding unit and perform convolution processing on the feature map to extract a feature of the feature map and obtain the three-dimensional tensor.

In another embodiment, to ensure that for feature maps of different sizes, dimensions corresponding to the finally outputted three-dimensional tensor are the same, the neural network model may further perform convolution and pooling operations on the feature map by using the convolutional neural network to obtain the three-dimensional tensor. That is, compared with the previous implementation, a pooling layer is added to the convolutional neural network, and down-sampling processing is performed on an output of a convolution layer by using the pooling layer. A pooling process is actually a process of obtaining a maximum value of the convolution layer based on an area or obtaining a maximum value of each convolution layer.

To control an additional parameter and training overheads caused by the convolutional neural network, the step 302 may be performed by using the convolutional neural network including only one convolution layer. Certainly, to obtain a better feature extraction effect, the step 302 may also be performed by using the convolutional neural network including a plurality of convolution layers. The number of convolution layers included in the used convolutional neural network is not limited herein.

Step 303. The server performs serialization processing on the three-dimensional tensor to obtain a one-dimensional vector.

In this embodiment of this application, one one-dimensional vector is used as an example for description, and there may be one or more one-dimensional vectors. The number of one-dimensional vectors is not specifically limited in this embodiment of this application.

After the three-dimensional tensor is obtained through processing by the convolutional neural network, the neural network model further performs the serialization processing on the three-dimensional tensor, and pulls the three-dimensional tensor into the one-dimensional vector. As shown in FIG. 4, the neural network model performs serialization processing on the three-dimensional tensor 405 and pulls the three-dimensional tensor 405 into a one-dimensional vector 406.

Step 304. The server performs linear transformation on the one-dimensional vector to obtain the feature fusion vector corresponding to the plurality of attention networks.

Finally, the linear transformation is performed on the one-dimensional vector obtained in step 303, to obtain the feature fusion vector corresponding to the plurality of attention networks.

In the method in which the convolution is applied to perform the feature fusion on the feature map formed by the respective output vectors of the plurality of attention networks, the convolutional neural network is applied to perform the feature fusion on the respective output vectors of the plurality of attention networks with reference to success of the convolutional neural network on image feature extraction, so that the respective output vectors of the plurality of attention networks can be fully interacted, to generate the feature fusion vector with more information amount, thereby ensuring a better final output representation.

The convolution is a local operation, and only local feature elements can be directly interacted with each other through a convolution kernel in the convolution layer. Therefore, to cause all elements in the respective output vectors of the plurality of attention networks to be directly interacted, this embodiment of this application further provides a second nonlinear transformation method, that is, a bilinear model is applied to perform feature fusion on the respective output vectors of the plurality of attention networks. The bilinear model is formed by an outer product operation and a linear mapping, which can ensure that all elements in the respective output vectors of the plurality of attention networks can be fully interacted in a second order.

Figure 5:
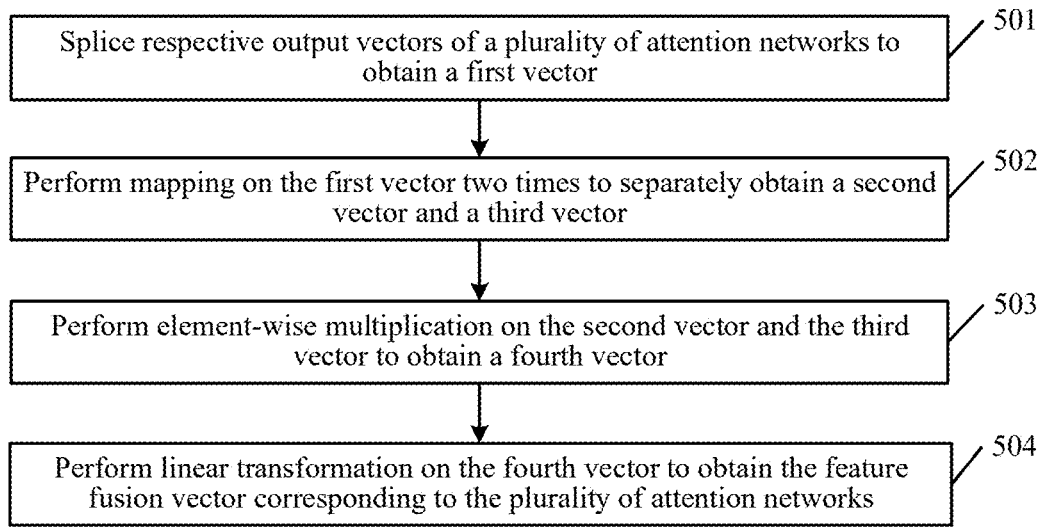
FIG. 5 is a schematic flowchart of another nonlinear transformation method according to an embodiment of this application.

FIG. 5 is a schematic flowchart corresponding to the nonlinear transformation method. As shown in FIG. 5, the method includes the following steps.

Step 501. A server splices respective output vectors of a plurality of attention networks to obtain a first vector.

After obtaining the respective output vectors of the plurality of attention networks, the neural network model splices the output vectors of the attention networks to obtain the first vector. For example, if the neural network model includes three attention networks, and output vectors of the attention networks are 10*10 vectors, the output vectors of the attention networks are spliced to obtain a 10*30 first vector.

Assuming that the respective output vectors of the attention networks are respectively $O_1, O_2, \ldots, O_n$, an implementation formula for splicing the output vectors to obtain a first vector $\hat{O}$ is as follows:

$$\hat{O} = [O_1, O_2, \ldots, O_n]$$

where [ ] represents vector splicing.

Figure 6:
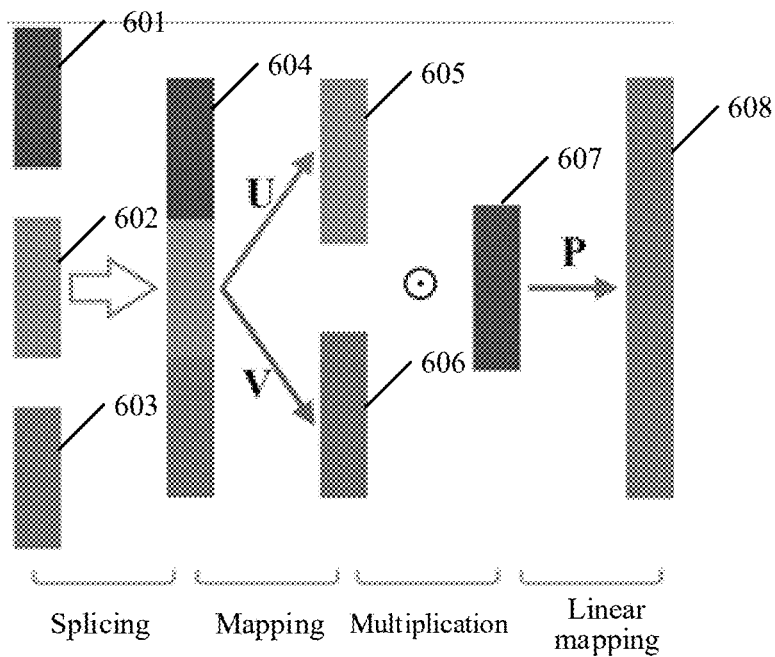
FIG. 6 is a schematic diagram of another nonlinear transformation method according to an embodiment of this application.

For ease of understanding, the following describes an implementation process of steps in this embodiment with reference to FIG. 6, and FIG. 6 is a schematic diagram corresponding to the nonlinear transformation method. As shown in FIGS. 6, 601, 602, and 603 are output vectors of attention networks. In step 501, the neural network model splices the output vector 601, the output vector 602, and the output vector 603 to obtain a first vector 604.

It is to be understood that FIG. 6 is only an example. In some embodiments, the number of attention networks included in the neural network model is not limited to three, and correspondingly, the number of output vectors corresponding to the attention networks is also not limited to three. That is, in some embodiments, the neural network model needs to splice more than three output vectors. The number of output vectors is not limited herein.

Step 502. The server performs mapping two times on the first vector to separately obtain a second vector and a third vector.

Further, the neural network model separately performs the mapping on the first vector two times to obtain the second vector and the third vector, that is, two times of mapping is performed on the first vector by using a bilinear model, to separately obtain the second vector and the third vector.

The neural network model may perform the linear mapping on the first vector two times to separately obtain the second vector and the third vector, that is, perform one time of linear mapping on the first vector to obtain the second vector and perform the other time of linear mapping on the first vector to obtain the third vector. Certainly, nonlinear mapping may alternatively be performed two times on the first vector separately to obtain the second vector and the third vector, that is, nonlinear mapping is performed once on the first vector to obtain the second vector, and nonlinear mapping is performed a second time on the first vector to obtain the third vector. A specific mapping method is not limited herein.

When the linear mapping is performed on the first vector, a specific formula of performing the linear mapping on the first vector two times is as follows:

$$\hat{U} = \hat{O}^T U$$

$$\hat{V} = \hat{O}^T V$$

where $\hat{U}$ is the second vector, U is a mapping parameter corresponding to the first-time linear mapping, $\hat{V}$ is the third vector, V is a mapping parameter corresponding to the second-time linear mapping, $\hat{O}$ is the first vector, and $\hat{O}^T$ is a transposition of the first vector $\hat{O}$.

As shown in FIG. 6, the linear mapping is separately performed on the first vector 604 by using different mapping parameters U and V, to obtain a second vector 605 and a third vector 606.

Step 503. The server performs element-wise multiplication on the second vector and the third vector to obtain a fourth vector.

The neural network model then performs the element-wise multiplication on the second vector and the third vector to obtain the fourth vector. Through the multiplication method, elements in the second vector and the third vector are fully interacted.

A specific formula for calculating the fourth vector is as follows:

$$O' = \hat{U} \odot \hat{V}$$

where O' is the fourth vector, $\hat{U}$ is the second vector, and $\hat{V}$ is the third vector.

As shown in FIG. 6, the neural network model performs the element-wise multiplication on the second vector 605 and the third vector 606 to obtain a fourth vector 607.

Step 504. The server performs linear mapping on the fourth vector to obtain the feature fusion vector corresponding to the plurality of attention networks.

Finally, the linear mapping is performed on the fourth vector, to obtain the feature fusion vector corresponding to the plurality of attention networks in the neural network model.

A specific formula for performing the linear mapping on the fourth vector is as follows:

$$O = O'^* P$$

where O is the feature fusion vector, O' is the fourth vector, and P is a linear mapping parameter.

As shown in FIG. 6, the neural network model performs the linear mapping on the fourth vector 607, to finally obtain a feature fusion vector 608.

In the method in which the bilinear model is applied to perform the feature fusion on the respective output vectors of the plurality of attention networks, a low-order bilinear model similar to an original bilinear model is applied, and it is ensured that all elements in the respective output vectors of the attention networks can be interacted with each other in a second order, so that the respective output vectors of the attention networks can be fully interacted, to generate the feature fusion vector with more information amount, thereby ensuring a better final output representation.

The inventor finds through research that there is a mutual improvement relationship between the second-order interaction and the first-order interaction, and correspondingly, that the second-order interaction and the first-order interaction may bring a more efficient feature fusion mechanism is considered at the same time. Therefore, this embodiment of this application provides a third nonlinear transformation method, that is, both a bilinear model and vector splicing are applied to perform feature fusion on the respective output vectors of the plurality of attention networks, to perform modeling on a second-order relationship and a first-order relationship between all elements in the output vectors of the plurality of attention networks.

Figure 7:
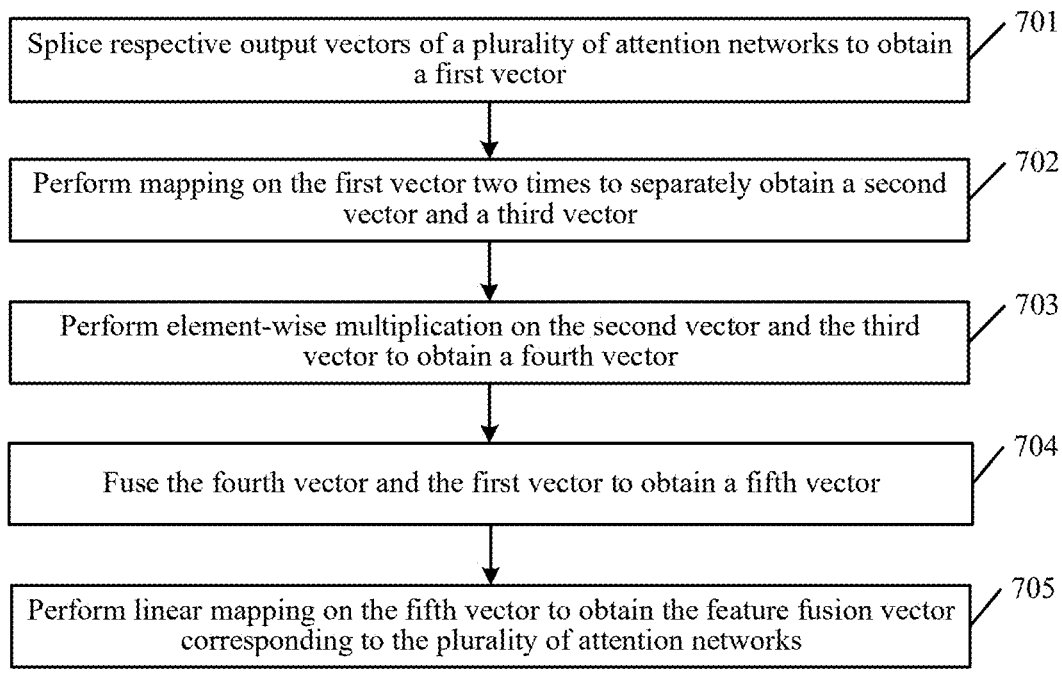
FIG. 7 is a schematic flowchart of still another nonlinear transformation method according to an embodiment of this application.

FIG. 7 is a schematic flowchart corresponding to the nonlinear transformation method. As shown in FIG. 7, the method includes the following steps.

Step 701. A server splices respective output vectors of a plurality of attention networks to obtain a first vector.

Step 702. The server performs mapping on the first vector two times to separately obtain a second vector and a third vector.

Step 703. The server performs element-wise multiplication on the second vector and the third vector to obtain a fourth vector.

A specific implementation process of steps 701 to 703 is similar to a specific implementation process of steps 501 to 503 shown in FIG. 5. For detailed description, reference is made to the related description of steps 501 to 503, and details are not described herein again.

Figure 8:
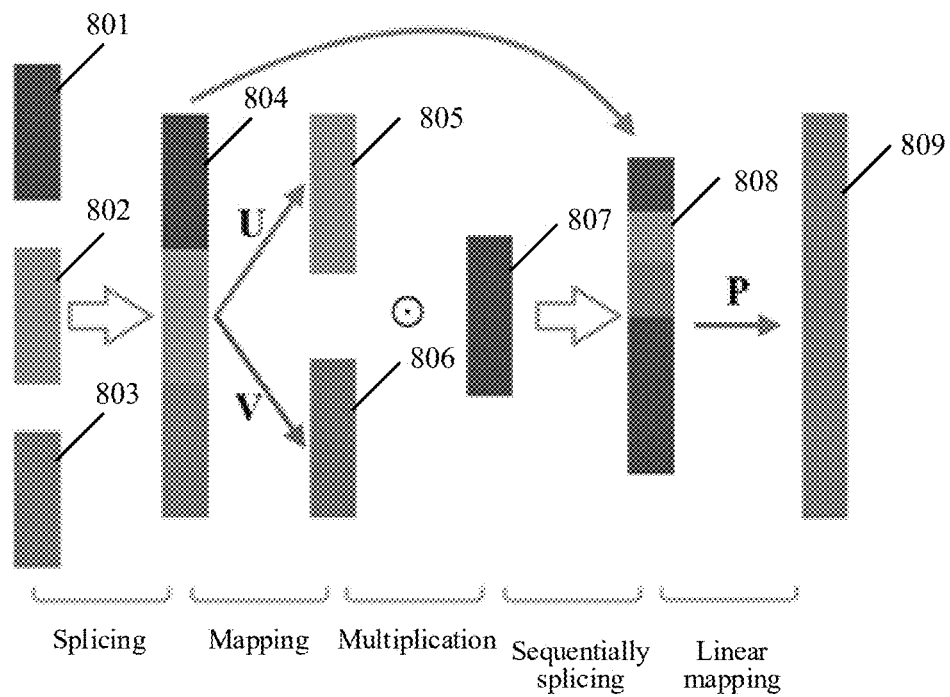
FIG. 8 is a schematic diagram of still another nonlinear transformation method according to an embodiment of this application.

For ease of understanding the nonlinear transformation method shown in FIG. 7, the following describes an implementation process of steps in the transformation method with reference to FIG. 8, and FIG. 8 is a schematic diagram corresponding to the nonlinear transformation method.

As shown in FIGS. 8, 801, 802, and 803 are respectively output vectors of the attention networks. The neural network model splices the output vector 801, the output vector 802, and the output vector 803 in step 701 to obtain a first vector 804; the neural network model then separately performs the linear mapping on the first vector 804 by using different mapping parameters U and V in step 702, to obtain a second vector 805 and a third vector 806, and subsequently, the neural network model performs the element-wise multiplication on the second vector 805 and the third vector 806 in step 703, to obtain a fourth vector 807.

Step 704. The server fuses the fourth vector and the first vector to obtain a fifth vector.

After performing the element-wise multiplication on the second vector and the third vector to obtain the fourth vector, the neural network model further fuses the fourth vector and the first vector obtained by splicing the output vectors in step 701, to obtain the fifth vector.

Specifically, when the fourth vector and the first vector are fused, the neural network model may sequentially splice the fourth vector and the first vector to obtain the fifth vector, that is, splice the fourth vector and the first vector according to a splicing method in step 701; or the neural network model may perform the element-wise multiplication on the fourth vector and the first vector to obtain the fifth vector, that is, perform element-wise multiplication on the fourth vector and the first vector according to a multiplication method in step 703 to obtain the fifth vector; or the neural network model may perform element-wise addition on the fourth vector and the first vector to obtain the fifth vector, that is, elements with corresponding locations in the fourth vector and the first vector are added.

When the fifth vector is obtained by using the sequential splicing method, a specific calculation formula thereof is as follows:

$$O''=[\hat{O}^T U \odot \hat{O}^T V, O]$$

where [ ]represent vector splicing, O" is the fifth vector, $\hat{O}^T U \odot \hat{O}^T V$ is the fourth vector, and $\hat{O}$ is the first vector.

As shown in FIG. 8, the neural network model sequentially splices the fourth vector 807 and first vector 804 to obtain a fifth vector 808.

Step 705. The server performs linear mapping on the fifth vector to obtain the feature fusion vector corresponding to the plurality of attention networks.

Finally, the linear mapping is performed on the fifth vector, to obtain the feature fusion vector corresponding to the plurality of attention networks in the neural network model.

A specific formula for performing the linear mapping on the fifth vector is as follows:

$$O=O''*P$$

where O is the feature fusion vector, O" is the fifth vector, and P is a linear mapping parameter.

As shown in FIG. 8, the neural network model performs the linear mapping on the fifth vector 808, to finally obtain a feature fusion vector 809.

In the foregoing method in which both the bilinear model and the vector splicing are applied to perform the feature fusion on the respective output vectors of the plurality of attention networks, a mutual improvement relationship between a second-order interaction and a first-order interaction is considered, and that the second-order interaction and the first-order interaction can bring a more efficient feature fusion mechanism is considered at the same time, so that the respective output vectors of the attention networks can be fully interacted, to generate the feature fusion vector with more information amount, thereby ensuring a better final output representation.

In some embodiments, the neural network model may be a machine translation model, and the machine translation model includes an encoder and a decoder. The encoder includes N cascaded first-type network blocks, and each first-type network block includes one multi-head attention network layer and one feedforward neural network layer that are cascaded. The decoder includes N cascaded second-type network blocks, and each second-type network block includes two multi-head attention network layers and one feedforward neural network layer that are cascaded, N being a positive integer greater than or equal to 1 herein.

The machine translation model is a model for translating to-be-translated content into a corresponding translated text, for example, a mode for translating a to-be-translated Chinese text into a corresponding English text. The machine translation model may specifically be a neural machine translation (NMT) model.

Figure 9:
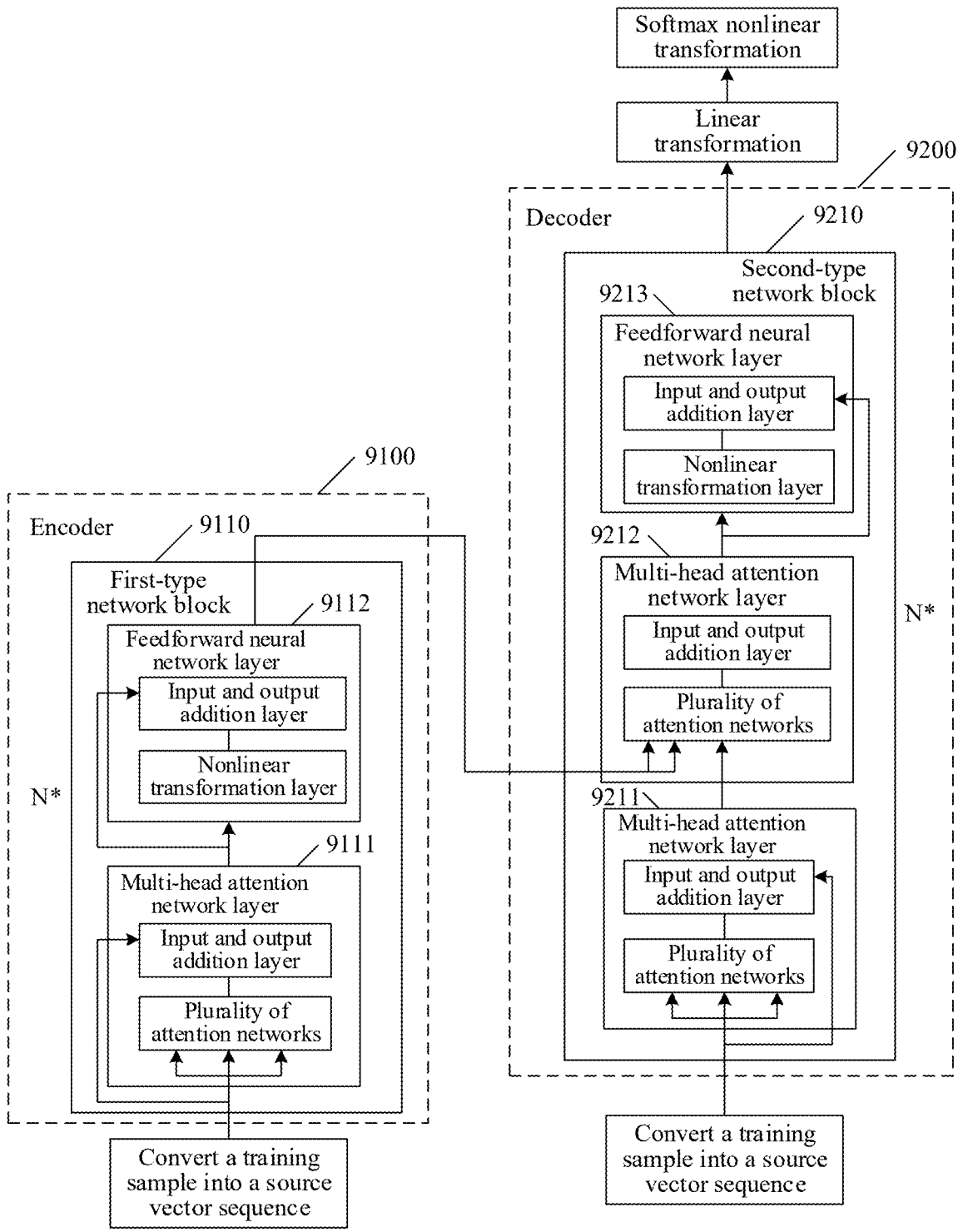
FIG. 9 is a schematic structural diagram of a machine translation model according to an embodiment of this application.

FIG. 9 is a schematic structural diagram of a machine translation model according to an embodiment of this application. As shown in FIG. 9, an encoder 9100 includes N cascaded first-type network blocks 9110, and each first-type network block 9110 includes one multi-head attention network layer 9111 and one feedforward neural network layer 9112 that are cascaded. The multi-head attention network layer 9111 includes a plurality of attention networks and an input and output addition layer, and the feedforward neural network layer 9112 includes a nonlinear transformation layer and an input and output addition layer. A decoder 9200 includes N cascaded second-type network blocks 9210, and each second-type network block 9210 includes two multi-head attention network layers 9211 and 9212 and one feedforward neural network layer 9213 that are cascaded. The multi-head attention network layers 9211 and 9212 in the decoder 9200 include a plurality of attention networks and an input and output addition layer, and the feedforward neural network layer 9213 includes a nonlinear transformation layer and an input and output addition layer.

An output of the encoder 9100 may be used as an input of the decoder 9200, and the decoder 9200 decodes data outputted by the encoder 9100. When model training is performed on the machine translation model, the encoder 9100 and the decoder 9200 are to be trained at the same time. When a similarity between a vector corresponding to a predicted translated text outputted by the decoder 9200 and a standard tag vector corresponding to a training sample reaches a preset threshold, it may be considered that the machine translation model meets a convergence condition, and the machine translation model may be used as a target neural network model.

The multi-head attention network layers perform feature fusion on respective output vectors of attention networks by using a nonlinear transformation method, to obtain a feature fusion vector corresponding to the multi-head attention network layers. The inventor trains a machine translation model by using the neural network model training method provided in the embodiments of this application, to correspondingly obtain the machine translation model. Test is performed on the machine translation model by using a bilingual evaluation understudy (BLEU), and Table 1 is a performance test result corresponding to the machine translation model.

TABLE 1

| Model | | Translation effect | | Computing resource | |
|---|---|---|---|---|---|
| | | Evaluation result | Δ | Quantity of parameters | Training speed |
| Standard | Paper [1] | 27.64 | — | 88M | 2.04 |
| The present disclosure | Model 1 | 28.19 | +0.55 | 98M | 1.45 |
| | Model 2 | 28.35 | +0.71 | 97M | 1.85 |
| | Model 3 | 28.59 | +0.95 | 102M | 1.78 |

The paper [1] is a test sample, the test sample is translated by using an existing machine translation model, an evaluation result is 27.64 points, the number of parameters involved in the model is 88 million (M), and a training speed for the machine translation model is 2.04 iterations per second. The model 1 fuses respective output vectors of a plurality of attention networks by using the nonlinear transformation method shown in FIG. 3 into a feature fusion vector, the test sample paper [1] is translated by using the model 1, an evaluation result is 28.19 points, the evaluation result improves 0.55 point compared with the evaluation result of performing translation by using the existing machine translation model, The number of parameters involved in the model is 98M, and a training speed for the model 1 is 1.45 iterations per second. The model 2 fuses the respective output vectors of the plurality of attention networks by using the nonlinear transformation method shown in FIG. 5 into the feature fusion vector, the test sample paper [1] is translated by using the model 2, an evaluation result is 28.35 points, the evaluation result improves 0.71 point compared with the evaluation result of performing translation by using the existing machine translation model, The number of parameters involved in the model is 97M, and a training speed for the model 2 is 1.85 iterations per second. The model 3 fuses the respective output vectors of the plurality of attention networks by using the nonlinear transformation method shown in FIG. 7 into the feature fusion vector, the test sample paper [1] is translated by using the model 3, an evaluation result is 28.59 points, the evaluation result improves 0.95 point compared with the evaluation result of performing translation by using the existing machine translation model, The number of parameters involved in the model is 102M, and a training speed for the model 3 is 1.78 iterations per second.

It may be found through comparison that regardless of the neural network model uses the nonlinear transformation method shown in FIG. 3, or uses the nonlinear transformation method shown in FIG. 5, or uses the nonlinear transformation method shown in FIG. 7, translation quality can be effectively improved by using the neural network model obtained by performing training through the training method provided in the embodiments of this application, The number of parameters is increased rarely, and a training speed is reduced, thereby ensuring high efficiency of the machine translation model.

Figure 10:
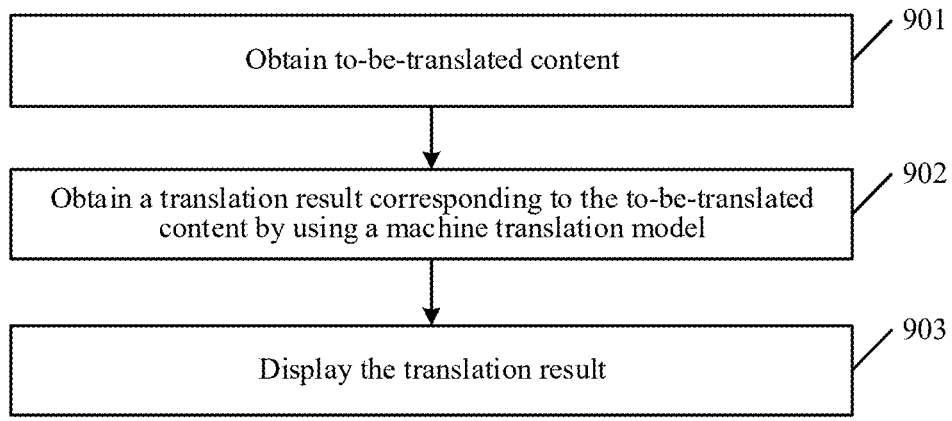
FIG. 10 is a schematic flowchart of a machine translation method according to an embodiment of this application.

For the machine translation model shown in FIG. 9, the embodiments of this application further provide a machine translation method, so that the machine translation model can be applied in practice. FIG. 10 is a schematic flowchart of a machine translation method according to an embodiment of this application. For ease of description, the following describes the machine translation method by using a terminal device as an execution body. It is to be understood that the machine translation method may also be applied to a server in some embodiments. As shown in FIG. 10, the machine translation method includes the following steps.

Step 901. A terminal device obtains to-be-translated content.

The to-be-translated content may specifically be at least one of a to-be-translated text, a to-be-translated video, or to-be-translated audio, and different types of to-be-translated content may be applied to different application scenarios. For example, when to-be-translated content is the to-be-translated text, the to-be-translated text may be translated into a corresponding language. In another example, when to-be-translated content is the to-be-translated video, the to-be-translated video may be translated into a text corresponding to a scenario presented by the video. In still another example, when to-be-translated content is the to-be-translated audio, the to-be-translated audio may be translated into a text corresponding to the audio, or translated into a text corresponding to a designated language.

For a to-be-translated text, the terminal device may provide a text input box for a user, and the user may input the to-be-translated text in the text input box. Correspondingly, the terminal device obtains a text inputted in the text input box by the user as to-be-translated content. For a to-be-translated video and/or to-be-translated audio, the terminal device may provide a file upload area for a user, and the user may drag the to-be-translated video and/or audio into the to-be-translated file upload area. Correspondingly, when detecting that there is a file in the file upload area, the terminal device uses the file as to-be-translated content. Alternatively, the terminal device may provide a file upload key for a user, the user triggers an operation of uploading a file by clicking the file upload key, selects the to-be-translated video and/or audio from files stored in the terminal device, and uploads the selected to-be-translated video and/or audio, and the terminal device obtains to-be-translated content in this way.

When the execution body of the machine translation method is a server, the server may obtain to-be-translated content from the terminal device. Specifically, the server is connected to the terminal device through a network, and after obtaining to-be-translated content in the method, the terminal device correspondingly sends the obtained to-be-translated content to the server through the network, so that the server obtains the to-be-translated content.

Step 902. The terminal device obtains a translation result corresponding to the to-be-translated content by using a machine translation model.

After obtaining the to-be-translated content, the terminal device correspondingly inputs the to-be-translated content into the machine translation model. The machine translation model is obtained by performing training according to the neural network model training method provided in the foregoing embodiments, and for a specific structure of the machine translation model, reference may be made to FIG. 9.

An encoder in the machine translation model is a recurrent neural network model and is capable of reading a source vector sequence corresponding to to-be-translated content as a code with a fixed length. A decoder in the machine translation model is also a recurrent neural network model and is capable of decoding an input sequence of the encoder, to output a target sequence, that is, output a vector sequence corresponding to a tag. Further, the machine translation model generates an output tag according to the vector sequence outputted by the decoder, that is, generates a translation result corresponding to the to-be-translated content.

The machine translation model is constructed based on a multi-attention mechanism, and both the encoder and the decoder include a plurality of attention networks. The machine translation model fuses respective output vectors of the plurality of attention networks in the encoder and the decoder by using the nonlinear transformation method. The nonlinear transformation method herein may be that convolution is applied to process the respective output vectors of the plurality of attention networks, or may be that a bilinear model is applied to process the respective output vectors of the plurality of attention networks, or may be that both a bilinear model and vector splicing are applied to process the respective output vectors of the plurality of attention networks.

Step 903. The terminal device displays the translation result.

After determining the translation result corresponding to the to-be-translated content by using the machine translation model, the terminal device may directly display the translation result to a user.

It is to be understood that when the execution body of the machine translation method provided in this embodiment is the server. After the server determines the translation result corresponding to the to-be-translated content by using the machine translation model, the server may send the determined translation result to the terminal device, to display the translation result to the user by using the terminal device.

According to the machine translation method provided in this embodiment, a machine translation model is applied to translate to-be-translated content, and determine a translation result corresponding to the to-be-translated content. The applied machine translation model is obtained by performing training by using the neural network model training method provided in the foregoing embodiments, and the machine translation model can enable output vectors of attention networks to be fully interacted, to generate a feature fusion vector with more information amount. Therefore, it can be ensured that a translation result finally outputted by the machine translation model is more accurate.

To further understand the neural network model training method provided in the embodiments of this application, the following overall describes, by using an example in which the server trains a machine translation model for translating a text, the neural network model training method provided in the embodiments of this application.

The server first obtains a training sample set from a database associated with the server, and the training sample set includes a large quantity of training samples and standard tag vectors corresponding to the training samples. It is to be understood that for the machine translation model for translating the text, the training sample is to be a to-be-translated text, and a standard tag corresponding to the training sample is a standard translated text. Correspondingly, the standard tag vector is a vector corresponding to the standard translated text.

After obtaining the training sample set, the server inputs the training samples in the training sample set into a pre-constructed machine translation model one by one. The machine translation model is a neural network model constructed based on an attention mechanism, and includes an encoder and a decoder. The encoder includes a plurality of cascaded first-type network blocks, and each first-type network block includes one multi-head attention network layer and one feedforward neural network layer that are cascaded. The decoder includes a plurality of cascaded second-type network blocks, and each second-type network block includes two multi-head attention network layers and one feedforward neural network layer that are cascaded.

The multi-head attention network layers included in the first-type network block and the second-type network block include a plurality of attention networks, and the attention networks are capable of capturing different feature information from different dimensions and correspondingly generating output vectors according to the captured feature information.

The server performs nonlinear transformation on the respective output vectors of the plurality of attention networks in the multi-head attention network layer by using the machine translation model, to obtain a feature fusion vector corresponding to the plurality of attention networks. The nonlinear transformation method herein may specifically be that convolution is applied to perform feature fusion on a feature map formed by the respective output vectors of the plurality of attention networks, a bilinear model is applied to perform the feature fusion on the respective output vectors of the plurality of attention networks, and both a bilinear model and vector splicing are applied to perform the feature fusion on the respective output vectors of the plurality of attention networks.

The machine translation model generates a predicted tag vector corresponding to the training sample according to the feature fusion vector, compares the predicted tag vector with the standard tag vector corresponding to the training sample, to generate a result of comparison, and performs iteration adjustment on a model parameter of the machine translation model according to the result of comparison, to gradually optimize performance of the machine translation model, until the machine translation model meets a convergence condition, to use the machine translation model meeting the convergence condition as a target machine translation model. The target machine translation model may be implemented in various applications.

For the neural network model training method described in the foregoing, this application further provides a corresponding neural network model training apparatus, so that the neural network model training method can be applied and implemented in practice.

Figure 11:
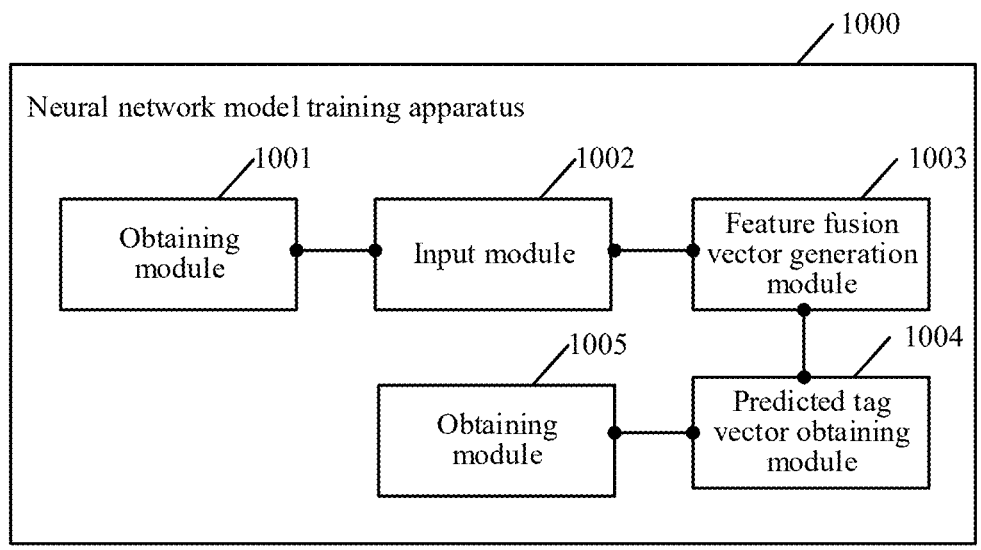
FIG. 11 is a schematic structural diagram of a neural network model training apparatus according to an embodiment of this application.

FIG. 11 is a schematic structural diagram of a neural network model training apparatus 1000 corresponding to the neural network model training method shown in FIG. 1, and the neural network model training apparatus 1000 includes:
- an obtaining module 1001, configured to obtain a training sample set, the training sample set including training samples and standard tag vectors corresponding to the training samples;
- an input module 1002, configured to input the training sample in the training sample set into a neural network model, the neural network model including a plurality of attention networks (that is, input the training sample in the training sample set into the plurality of attention networks of the neural network model);
- a feature fusion vector generation module 1003, configured to perform nonlinear transformation on respective output vectors of the plurality of attention networks, to obtain a feature fusion vector corresponding to the plurality of attention networks;
- a predicted tag vector obtaining module 1004, configured to obtain a predicted tag vector outputted by the neural network model according to the feature fusion vector, the predicted tag vector corresponding to the training sample; and
- an obtaining module 1005, configured to perform iteration adjustment on a model parameter of the neural network model according to a result of comparison between the predicted tag vector corresponding to the training sample and the standard tag vector, until a convergence condition is met, to obtain a target neural network model.

Figure 12:
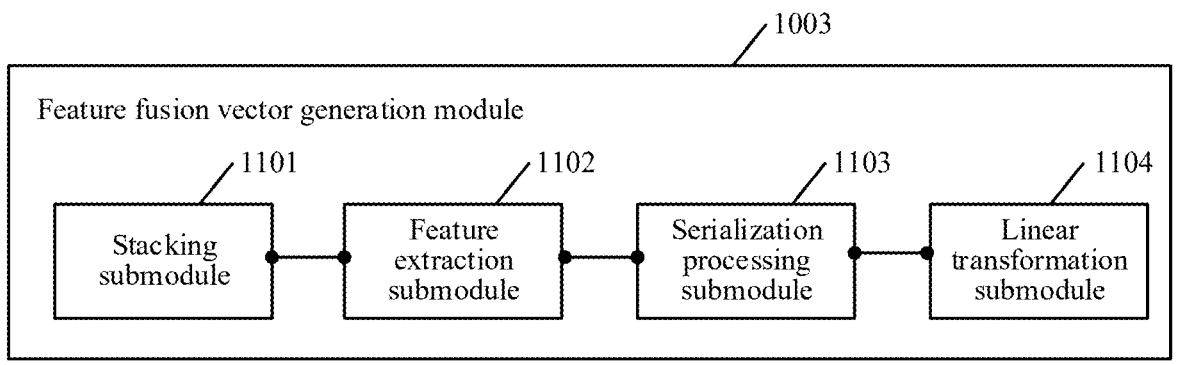
FIG. 12 is a schematic structural diagram of a feature fusion vector generation module according to an embodiment of this application.

In some embodiments, based on the neural network model training apparatus shown in FIG. 11, FIG. 12 is a schematic structural diagram of a feature fusion vector generation module 1003, and the feature fusion vector generation module 1003 specifically includes:
- a stacking submodule 1101, configured to stack the respective output vectors of the plurality of attention networks side by side into a two-dimensional feature map;
- a feature extraction submodule 1102, configured to extract a feature from the feature map by using a convolutional neural network to obtain a three-dimensional tensor;
- a serialization processing submodule 1103, configured to perform serialization processing on the three-dimensional tensor to obtain a one-dimensional vector; and
- a linear transformation submodule 1104, configured to perform linear transformation on the one-dimensional vector to obtain the feature fusion vector corresponding to the plurality of attention networks.

In some embodiments, based on the feature fusion vector generation module 1003 shown in FIG. 12, the feature extraction submodule 1102 is specifically configured to:
- perform a convolution operation on the feature map by using the convolutional neural network to obtain the three-dimensional tensor; or
- perform convolution and pooling operations on the feature map by using the convolutional neural network to obtain the three-dimensional tensor.

Figure 13:
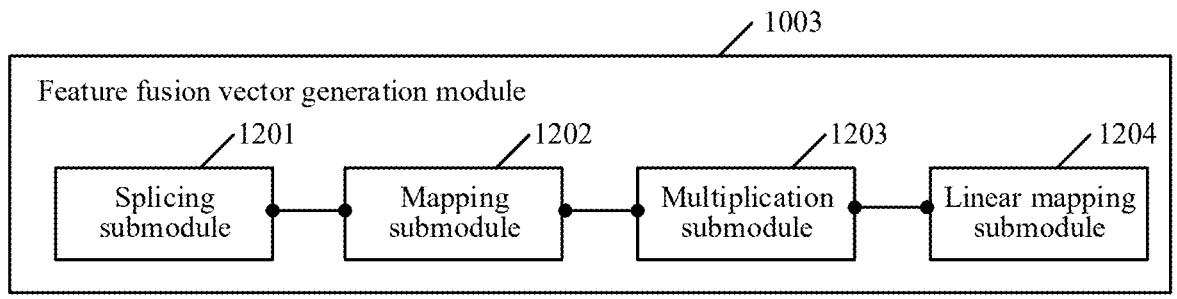
FIG. 13 is a schematic structural diagram of another feature fusion vector generation module according to an embodiment of this application.

In some embodiments, based on the neural network model training apparatus shown in FIG. 11, FIG. 13 is a schematic structural diagram of another feature fusion vector generation module 1003, and the feature fusion vector generation module 1003 specifically includes:
- a splicing submodule 1201, configured to splice the respective output vectors of the plurality of attention networks to obtain a first vector;
- a mapping submodule 1202, configured to perform mapping on the first vector two times to separately obtain a second vector and a third vector;
- a multiplication submodule 1203, configured to perform element-wise multiplication on the second vector and the third vector to obtain a fourth vector; and
- a linear mapping submodule 1204, configured to perform linear mapping on the fourth vector to obtain the feature fusion vector corresponding to the plurality of attention networks.

Figure 14:
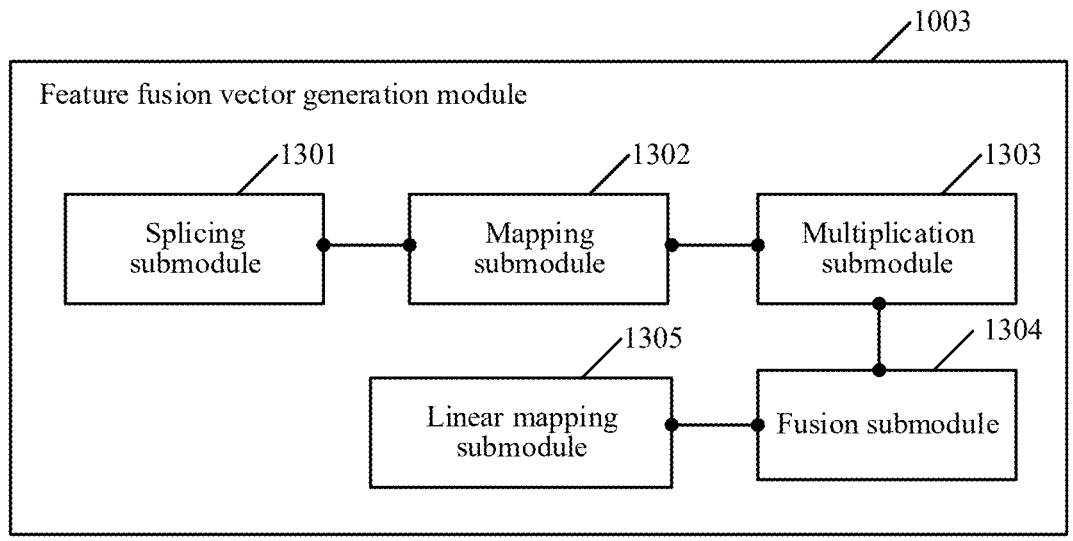
FIG. 14 is a schematic structural diagram of still another feature fusion vector generation module according to an embodiment of this application.

In some embodiments, based on the neural network model training apparatus shown in FIG. 11, FIG. 14 is a schematic structural diagram of still another feature fusion vector generation module 1003, and the feature fusion vector generation module 1003 specifically includes:
- a splicing submodule 1301, configured to splice the respective output vectors of the plurality of attention networks to obtain the first vector;
- a mapping submodule 1302, configured to perform the mapping on the first vector two times to separately obtain the second vector and the third vector;
- a multiplication submodule 1303, configured to perform the element-wise multiplication on the second vector and the third vector to obtain the fourth vector;
- a fusion submodule 1304, configured to fuse the fourth vector and the first vector to obtain a fifth vector; and
- a linear mapping submodule 1305, configured to perform linear mapping on the fifth vector to obtain the feature fusion vector corresponding to the plurality of attention networks.

In some embodiments, based on the feature fusion vector generation module shown in FIG. 13 and FIG. 14, the mapping submodules 1202 and 1302 are specifically configured to:
- perform linear mapping on the first vector two times to separately obtain the second vector and the third vector; or
- perform nonlinear mapping on the first vector two times to separately obtain the second vector and the third vector.

In some embodiments, based on the feature fusion vector generation module shown in FIG. 14, the fusion submodule 1304 is specifically configured to:
- sequentially splice the fourth vector and the first vector to obtain the fifth vector; or
- perform element-wise multiplication on the fourth vector and the first vector to obtain the fifth vector; or
- perform element-wise addition on the fourth vector and the first vector to obtain the fifth vector.

In some embodiments, based on the neural network model training apparatus shown in FIG. 11, the obtaining module 1005 is specifically configured to:

determine a loss function value according to the result of comparison between the predicted tag vector corresponding to the training sample and the standard tag vector;

perform the iteration adjustment on the model parameter of the neural network model when the loss function value is greater than a target threshold; and when the loss function value is less than or equal to the target threshold, determine that the current neural network model meets the convergence condition, and use the current neural network model as the target neural network model.

In some embodiments, the neural network model is a machine translation model and includes an encoder and a decoder.

The encoder includes N cascaded first-type network blocks, and each first-type network block includes one multi-head attention network layer and one feedforward neural network layer that are cascaded.

The decoder includes N cascaded second-type network blocks, each second-type network block includes two multi-head attention network layers and one feedforward neural network layer that are cascaded, and N is a positive integer greater than or equal to 1.

In some embodiments, the training sample is at least one of a to-be-translated text, a to-be-translated video, or to-be-translated audio, and a standard tag corresponding to the training sample is a standard translated text.

In the neural network model training apparatus, when the respective output vectors of the plurality of attention networks are fused by using the neural network model, the respective output vectors of the attention networks are fused in a nonlinear transformation method to obtain the feature fusion vector. Compared with the related art in which linear splicing is performed on the respective output vectors of the attention networks to obtain the feature fusion vector, a complex relationship between the output vectors of the attention networks is considered in the nonlinear transformation method, so that the output vectors of the attention networks can be fully interacted, to generate the feature fusion vector with more information amount, thereby ensuring a better final output representation effect.

For the machine translation method described in the foregoing, this application further provides a corresponding machine translation apparatus, so that the machine translation method can be applied and implemented in practice.

Figure 15:
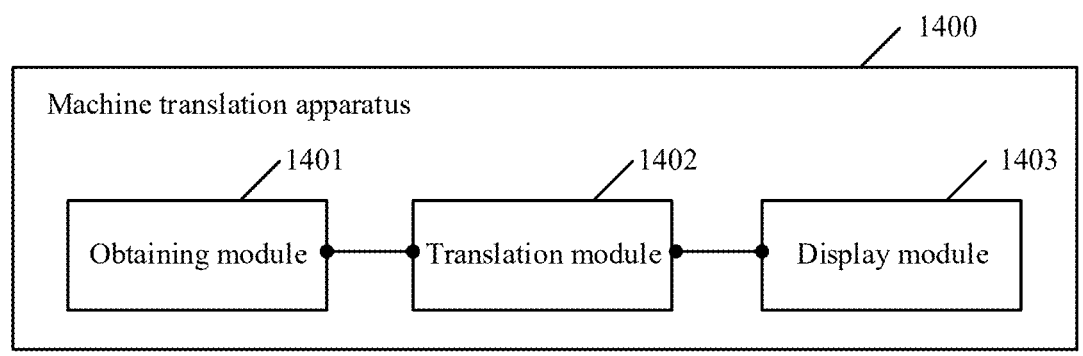
FIG. 15 is a schematic structural diagram of a machine translation apparatus according to an embodiment of this application.

FIG. 15 is a schematic structural diagram of a machine translation apparatus 1400 corresponding to the machine translation method shown in FIG. 10, and the machine translation apparatus 1400 includes:

an obtaining module 1401, configured to obtain to-be-translated content;

a translation module 1402, configured to obtain a translation result corresponding to the to-be-translated content by using a machine translation model, the machine translation model being obtained by performing training according to the neural network model training method shown in FIG. 2 to FIG. 8; and a display module 1403, configured to display the translation result.

According to the machine translation apparatus provided in this embodiment, a machine translation model is applied to translate to-be-translated content, and determine a translation result corresponding to the to-be-translated content. The applied machine translation model is obtained by performing training by using the neural network model training method provided in the foregoing embodiments, and the machine translation model can enable output vectors of attention networks to be fully interacted, to generate a feature fusion vector with more information amount. Therefore, it can be ensured that a translation result finally outputted by the machine translation model is more accurate.

Figure 16:
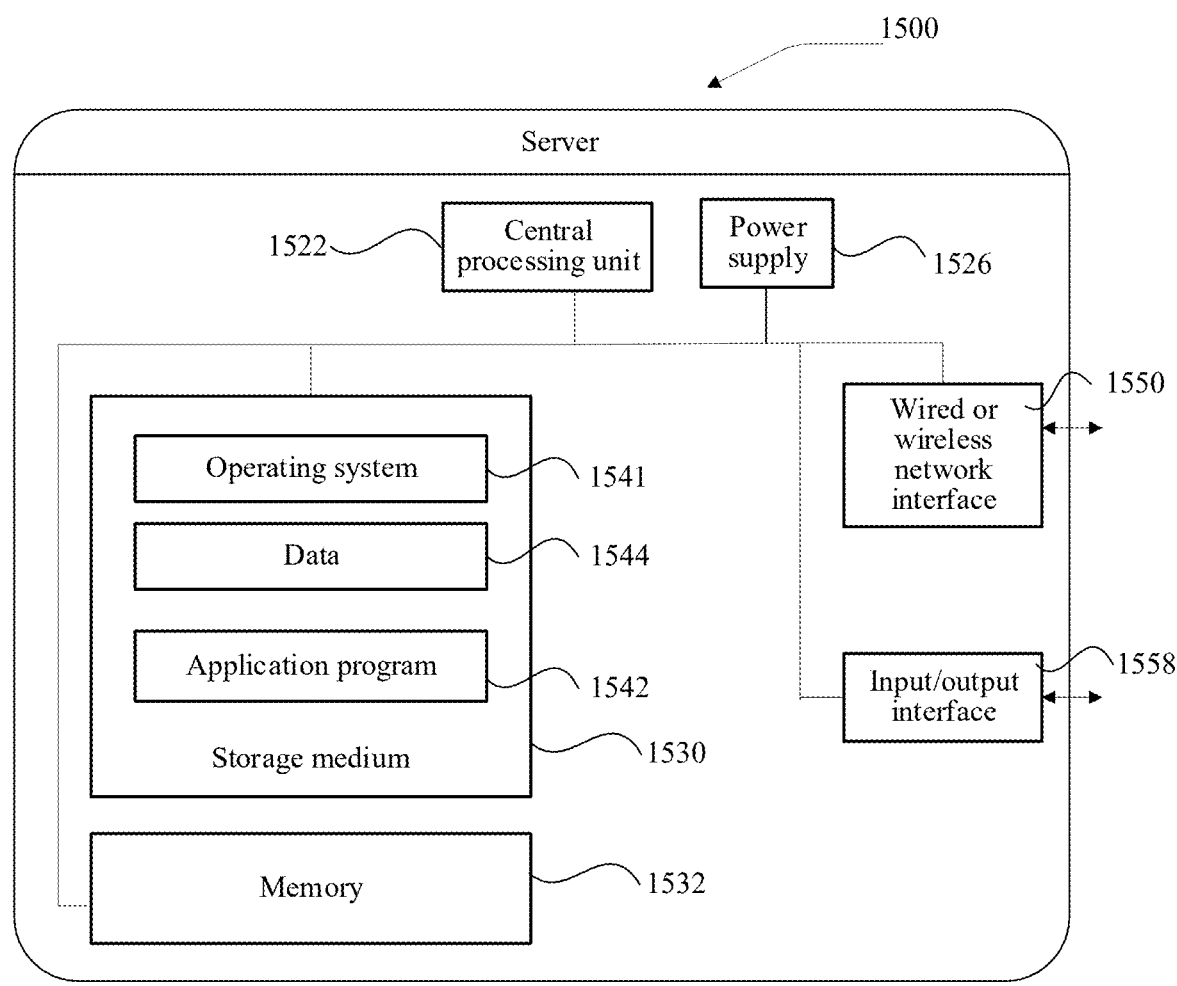
FIG. 16 is a schematic structural diagram of a server according to an embodiment of this application.

This application further provides a computer device for training a neural network model, and the computer device may specifically be a server. FIG. 16 is a schematic structural diagram of a server for training a neural network model according to an embodiment of this application. The server 1500 may vary greatly due to different configurations or performance, and may include one or more central processing units (CPU) 1522 (for example, one or more processors) and a memory 1532, and one or more storage medium 1530 (for example, one or more mass storage devices) that store application programs 1542 or data 1544. The memory 1532 and the storage medium 1530 may be transient storage or persistent storage. The program stored in the storage medium 1530 may include one or more modules (not marked in the figure), and each module may include a series of instruction operations to the server. Further, the central processing unit 1522 may be set to communicate with the storage medium 1530, and execute, on the server 1500, the series of instruction operations stored in the storage medium 1530.

The server 1500 may further include one or more power supplies 1526, one or more wired or wireless network interfaces 1550, one or more input/output interfaces 1558, and/or one or more operating systems 1541 such as Windows Server™, Mac OS X™, Unix™, Linux™, and FreeBSD™.

The steps performed by the server in the foregoing embodiments may be based on the server structure shown in FIG. 16.

The CPU 1522 is configured to perform the following steps according to program code:

obtaining a training sample set, the training sample set including a training sample and a standard tag vector corresponding to the training sample;

inputting the training sample in the training sample set into a neural network model, the neural network model including a plurality of attention networks (that is, input the training sample in the training sample set into the plurality of attention networks of the neural network model);

performing nonlinear transformation on respective output vectors of the plurality of attention networks by using the neural network model, to obtain a feature fusion vector corresponding to the plurality of attention networks;

obtaining a predicted tag vector outputted by the neural network model according to the feature fusion vector, the predicted tag vector corresponding to the training sample; and performing iteration adjustment on a model parameter of the neural network model according to a result of comparison between the predicted tag vector corresponding to the training sample and the standard tag vector, until a convergence condition is met, to obtain a target neural network model.

In some embodiments, the CPU 1522 is configured to perform the following steps according to the program code:

stacking the respective output vectors of the plurality of attention networks side by side into a two-dimensional feature map;

extracting a feature from the feature map by using a convolutional neural network to obtain a three-dimensional tensor;

performing serialization processing on the three-dimensional tensor to obtain a one-dimensional vector; and performing linear transformation on the one-dimensional vector to obtain the feature fusion vector corresponding to the plurality of attention networks.

In some embodiments, the CPU 1522 is configured to perform the following steps according to the program code:

performing a convolution operation on the feature map by using the convolutional neural network to obtain the three-dimensional tensor; or performing convolution and pooling operations on the feature map by using the convolutional neural network to obtain the three-dimensional tensor.

In some embodiments, the CPU 1522 is configured to perform the following steps according to the program code:

splicing the respective output vectors of the plurality of attention networks to obtain a first vector;

performing mapping on the first vector two times to separately obtain a second vector and a third vector;

performing element-wise multiplication on the second vector and the third vector to obtain a fourth vector; and performing linear mapping on the fourth vector to obtain the feature fusion vector corresponding to the plurality of attention networks.

In some embodiments, the CPU 1522 is configured to perform the following steps according to the program code:

splicing the respective output vectors of the plurality of attention networks to obtain the first vector;

performing the mapping on the first vector two times to separately obtain the second vector and the third vector;

performing the element-wise multiplication on the second vector and the third vector to obtain the fourth vector;

fusing the fourth vector and the first vector to obtain a fifth vector; and performing linear mapping on the fifth vector to obtain the feature fusion vector corresponding to the plurality of attention networks.

In some embodiments, the CPU 1522 is configured to perform the following steps according to the program code:

sequentially splicing the fourth vector and the first vector to obtain the fifth vector; or performing element-wise multiplication on the fourth vector and the first vector to obtain the fifth vector; or performing element-wise addition on the fourth vector and the first vector to obtain the fifth vector.

In some embodiments, the CPU 1522 is configured to perform the following steps according to the program code:

determining a loss function value according to the result of comparison between the predicted tag vector corresponding to the training sample and the standard tag vector;

performing the iteration adjustment on the model parameter of the neural network model when the loss function value is greater than a target threshold; and when the loss function value is less than or equal to the target threshold, determining that the current neural network model meets the convergence condition, and using the current neural network model as the target neural network model.

In some embodiments, the neural network model is a machine translation model and includes an encoder and a decoder.

The encoder includes N cascaded first-type network blocks, and each first-type network block includes one multi-head attention network layer and one feedforward neural network layer that are cascaded.

The decoder includes N cascaded second-type network blocks, each second-type network block includes two multi-head attention network layers and one feedforward neural network layer that are cascaded, and N is a positive integer greater than or equal to 1.

In some embodiments, the training sample is at least one of a to-be-translated text, a to-be-translated video, or to-be-translated audio, and a standard tag corresponding to the training sample is a standard translated text.

In addition, this application further provides a computer device, and a structure of the computer device (for example, a server) is similar to a structure of the server shown in FIG. 16. A memory thereof is configured to store a machine translation model, and the machine translation model is obtained by performing training according to the neural network model training method provided in the embodiments of this application. A processor thereof is configured to run the machine translation model to obtain a translation result corresponding to to-be-translated content.

Figure 17:
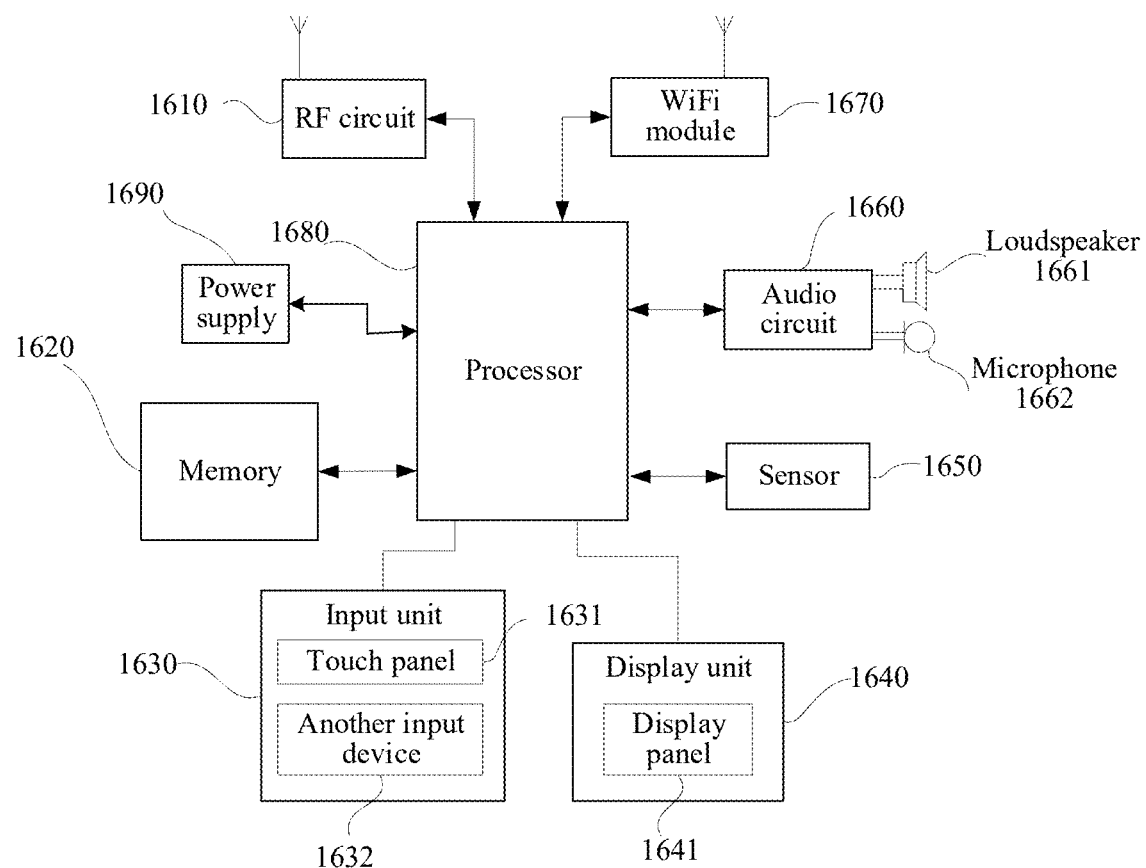
FIG. 17 is a schematic structural diagram of a terminal device according to an embodiment of this application.

An embodiment of this application further provides another device for training a neural network model, which may be a terminal device. As shown in FIG. 17, for ease of description, only parts related to the embodiments of this application are shown. For specific technical details that are not disclosed, reference is made to the method part in the embodiments of this application. The terminal may be any terminal device such as a mobile phone, a tablet computer, a personal digital assistant (PDA), a point of sales (POS), or an in-vehicle computer. An example in which the terminal is a mobile phone is used.

FIG. 17 is a block diagram of a part of a structure of a mobile phone related to a terminal according to an embodiment of this application. Referring to FIG. 17, the mobile phone includes: components such as a radio frequency (RF) circuit 1610, a memory 1620, an input unit 1630, a display unit 1640, a sensor 1650, an audio circuit 1660, a wireless fidelity (WiFi) module 1670, a processor 1680, and a power supply 1690. A person skilled in the art may understand that the structure of the mobile phone shown in FIG. 17 does not constitute a limitation on the mobile phone, and the mobile phone may include more components or fewer components than those shown in the figure, or some components may be combined, or a different component deployment may be used.

The following makes a specific description of components of the mobile phone with reference to FIG. 17.

The RF circuit 1610 may be configured to receive and transmit signals during an information receiving and transmitting process or a call process. Specifically, the RF circuit receives downlink information from a base station, then delivers the downlink information to the processor 1680 for processing, and transmits designed uplink data to the base station. Generally, the RF circuit 1610 includes, but is not limited to, an antenna, at least one amplifier, a transceiver, a coupler, a low noise amplifier (LNA), a duplexer, and the like. In addition, the RF circuit 1610 may also communicate with a network and another device by wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 1620 may be configured to store a software program and module. The processor 1680 runs the software program and module stored in the memory 1620, to implement various functional applications and data processing of the mobile phone. The memory 1620 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 1620 may include a high speed random access memory, and may also include a non-volatile memory, for example, at least one magnetic disk storage device, a flash memory, or another volatile solid-state storage device.

The input unit 1630 may be configured to receive input digit or character information, and generate a keyboard signal input related to the user setting and function control of the mobile phone. Specifically, the input unit 1630 may include a touch panel 1631 and another input device 1632. The touch panel 1631 is also referred to as a touchscreen, may collect a touch operation that is performed by a user on or near the touch panel 1631 (for example, an operation that is performed by a user by using any appropriate object or accessory such as a finger or a stylus on or near the touch panel 1631), and drive a corresponding connection apparatus according to a preset program. In some embodiments, the touch panel 1631 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1680. In addition, the touch controller can receive a command transmitted by the processor 1680 and execute the command. In addition, the touch panel 1631 may be implemented by using various types, such as a resistive type, a capacitance type, an infrared type, and a surface acoustic wave type. In addition to the touch panel 1631, the input unit 1630 may further include another input device 1632. Specifically, another input device 1632 may include, but is not limited to, one or more of a physical keyboard, a functional key (for example, a volume control key or a switch key), a track ball, a mouse, and a joystick.

The display unit 1640 may be configured to display information inputted by the user or information provided for the user, and various menus of the mobile phone. The display unit 1640 may include a display panel 1641. In some embodiments, the display panel 1641 may be configured by using a liquid crystal display (LCD), an organic light-emitting diode (OLED), or the like. Further, the touch panel 1631 may cover the display panel 1641. After detecting a touch operation on or near the touch panel 1631, the touch panel transfers the touch operation to the processor 1680, to determine a type of a touch event. Then, the processor 1680 provides a corresponding visual output on the display panel 1641 according to the type of the touch event. Although in FIG. 17, the touch panel 1631 and the display panel 1641 are used as two separate parts to implement input and output functions of the mobile phone, in some embodiments, the touch panel 1631 and the display panel 1641 may be integrated to implement the input and output functions of the mobile phone.

The mobile phone may further include at least one sensor 1650 such as an optical sensor, a motion sensor, and other sensors. Specifically, the optical sensor may include an ambient light sensor and a proximity sensor. The ambient light sensor may adjust luminance of the display panel 1641 according to brightness of the ambient light. The proximity sensor may switch off the display panel 1641 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1660, a loudspeaker 1661, and a microphone 1662 may provide audio interfaces between a user and the mobile phone. The audio circuit 1660 may convert received audio data into an electrical signal and transmit the electrical signal to the loudspeaker 1661. The loudspeaker 1661 converts the electrical signal into a sound signal for output. On the other hand, the microphone 1662 converts a collected sound signal into an electrical signal. The audio circuit 1660 receives the electrical signal, converts the electrical signal into audio data, and outputs the audio data to the processor 1680 for processing. Then, the processor transmits the audio data to, for example, another mobile phone by using the RF circuit 1610, or outputs the audio data to the memory 1620 for further processing.

Wi-Fi belongs to a short distance wireless transmission technology. The mobile phone may help, by using the Wi-Fi module 1670, a user to receive and transmit an email, browse a web page, access stream media, and the like. This provides wireless broadband Internet access for the user. Although FIG. 17 shows the Wi-Fi module 1670, it may be understood that the Wi-Fi module is not a necessary component of the mobile phone, and the Wi-Fi module may be omitted as required provided that the scope of the essence of the present disclosure is not changed.

The processor 1680 is a control center of the mobile phone, and is connected to various parts of the entire mobile phone by using various interfaces and lines. By running or executing a software program and/or module stored in the memory 1620, and invoking data stored in the memory 1620, the processor executes various functions of the mobile phone and performs data processing, thereby monitoring the entire mobile phone. In some embodiments, the processor 1680 may include one or more processing units. In some embodiments, the processor 1680 may integrate an application processor and a modem processor. The application processor mainly processes an operating system, a user interface, an application program, and the like. The modem processor mainly processes wireless communication. It may be understood that the foregoing modem may not be integrated into the processor 1680.

The mobile phone further includes the power supply 1690 (such as a battery) for supplying power to the components. In some embodiments, the power supply may be logically connected to the processor 1680 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of this application, the processor 1680 included in the terminal further has the following functions:

obtaining a training sample set, the training sample set including a training sample and a standard tag vector corresponding to the training sample;

inputting the training sample in the training sample set into a neural network model, the neural network model including a plurality of attention networks (that is, input the training sample in the training sample set into the plurality of attention networks of the neural network model);

performing nonlinear transformation on respective output vectors of the plurality of attention networks by using the neural network model, to obtain a feature fusion vector corresponding to the plurality of attention networks;

obtaining a predicted tag vector outputted by the neural network model according to the feature fusion vector, the predicted tag vector corresponding to the training sample; and performing iteration adjustment on a model parameter of the neural network model according to a result of comparison between the predicted tag vector corresponding to the training sample and the standard tag vector, until a convergence condition is met, to obtain a target neural network model.

In some embodiments, the processor 1680 may further perform method steps of any specific implementation of the neural network model training method in the embodiments of this application.

In addition, this application further provides a computer device, and a structure of the computer device (for example, a terminal device) is similar to a structure of the terminal device shown in FIG. 17. A memory thereof is configured to store a machine translation model, and the machine translation model is obtained by performing training according to the neural network model training method provided in the embodiments of this application. A processor thereof is configured to run the machine translation model, to obtain a translation result corresponding to to-be-translated content.

An embodiment of this application further provides a computer-readable storage medium, to store program code. The program code is used for executing any implementation in the neural network model training method in the foregoing embodiments, or executing the machine translation method in the foregoing embodiments.

In some embodiments, the program code stored in the storage medium is configured to perform the following steps:

obtaining a training sample set, the training sample set including a training sample and a standard tag vector corresponding to the training sample;

inputting the training sample in the training sample set into a plurality of attention networks of a neural network model, and performing nonlinear transformation on respective output vectors of the plurality of attention networks by using the neural network model, to obtain a feature fusion vector corresponding to the plurality of attention networks;

obtaining a predicted tag vector outputted by the neural network model according to the feature fusion vector, the predicted tag vector corresponding to the training sample; and performing iteration adjustment on a model parameter of the neural network model according to a result of comparison between the predicted tag vector corresponding to the training sample and the standard tag vector, until a convergence condition is met, to obtain a target neural network model.

In some embodiments, the program code stored in the storage medium is configured to perform the following steps:

stacking the respective output vectors of the plurality of attention networks side by side into a two-dimensional feature map;

extracting a feature from the feature map by using a convolutional neural network to obtain a three-dimensional tensor;

performing serialization processing on the three-dimensional tensor to obtain a one-dimensional vector; and performing linear transformation on the one-dimensional vector to obtain the feature fusion vector corresponding to the plurality of attention networks.

In some embodiments, the program code stored in the storage medium is configured to perform the following steps:

performing a convolution operation on the feature map by using the convolutional neural network to obtain the three-dimensional tensor; or performing convolution and pooling operations on the feature map by using the convolutional neural network to obtain the three-dimensional tensor.

In some embodiments, the program code stored in the storage medium is configured to perform the following steps:

splicing the respective output vectors of the plurality of attention networks to obtain a first vector;

performing mapping on the first vector two times to separately obtain a second vector and a third vector;

performing element-wise multiplication on the second vector and the third vector to obtain a fourth vector; and performing linear mapping on the fourth vector to obtain the feature fusion vector corresponding to the plurality of attention networks.

In some embodiments, the program code stored in the storage medium is configured to perform the following steps:

splicing the respective output vectors of the plurality of attention networks to obtain the first vector;

performing the mapping on the first vector two times to separately obtain the second vector and the third vector;

performing the element-wise multiplication on the second vector and the third vector to obtain the fourth vector;

fusing the fourth vector and the first vector to obtain a fifth vector; and performing linear mapping on the fifth vector to obtain the feature fusion vector corresponding to the plurality of attention networks.

In some embodiments, the program code stored in the storage medium is configured to perform the following steps:

sequentially splicing the fourth vector and the first vector to obtain the fifth vector; or performing element-wise multiplication on the fourth vector and the first vector to obtain the fifth vector; or performing element-wise addition on the fourth vector and the first vector to obtain the fifth vector.

In some embodiments, the program code stored in the storage medium is configured to perform the following steps:

determining a loss function value according to the result of comparison between the predicted tag vector corresponding to the training sample and the standard tag vector;

performing the iteration adjustment on the model parameter of the neural network model when the loss function value is greater than a target threshold; and when the loss function value is less than or equal to the target threshold, determining that the current neural network model meets the convergence condition, and using the current neural network model as the target neural network model.

In some embodiments, the neural network model is a machine translation model and includes an encoder and a decoder.

The encoder includes N cascaded first-type network blocks, and each first-type network block includes one multi-head attention network layer and one feedforward neural network layer that are cascaded.

The decoder includes N cascaded second-type network blocks, each second-type network block includes two multi-head attention network layers and one feedforward neural network layer that are cascaded, and N is a positive integer greater than or equal to 1.

In some embodiments, the training sample is at least one of a to-be-translated text, a to-be-translated video, or to-be-translated audio, and a standard tag corresponding to the training sample is a standard translated text.

In some embodiments, the program code stored in the storage medium is configured to perform the following steps:

obtaining to-be-translated content;

obtaining a translation result corresponding to the to-be-translated content by using a machine translation model, the machine translation model being obtained by performing training according to the model training method according to the foregoing embodiments; and displaying the translation result.

An embodiment of this application further provides a computer program product including an instruction. When the computer program product runs on a computer, the computer performs any implementation of the neural network model training method in the foregoing embodiments, or performs the machine translation method in the foregoing embodiments.

A person skilled in the art may clearly understand that, for the purpose of convenient and brief description, for specific work processes of the foregoing described system, apparatus, and unit, reference may be made to corresponding processes in the foregoing method embodiments, and details are not described herein again.

In the embodiments provided in this application, it is to be understood that the disclosed system, apparatus, and method may be implemented in other methods. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The modules or units described as separate parts may or may not be physically separate, and the parts displayed as modules and units may or may not be physical modules or units, may be located in one position, or may be distributed on a plurality of network modules or units. Some or all of the modules or units may be selected according to actual requirements to achieve the objectives of the solutions of the embodiments.

In addition, functional modules or units in the embodiments of this application may be integrated into one processing unit, or each of the modules or units may exist alone physically, or two or more units may be integrated into one module or unit. The integrated module or unit may be implemented in a form of hardware, or may be implemented in a form of a software function module or unit.

When the integrated module or unit is implemented in the form of a software functional module or unit and sold or used as an independent product, the integrated module or unit may be stored in a computer-readable storage medium. Based on such an understanding, the technical solutions of this application essentially, or the part contributing to the related technology, or all or some of the technical solutions may be implemented in a form of a software program. The computer software program is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely provided for describing the technical solutions of this application, but not intended to limit this application. A person of ordinary skill in the art shall understand that although this application has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

What is claimed is:

1. A neural network model training method, comprising:

obtaining a training sample set, the training sample set comprising a training sample and a standard tag vector corresponding to the training sample;

inputting the training sample into a plurality of attention networks of a neural network model, and performing nonlinear transformation on respective output vectors of the plurality of attention networks by using the neural network model;

obtaining a feature fusion vector corresponding to the plurality of attention networks;

obtaining a predicted tag vector outputted by the neural network model according to the feature fusion vector, the predicted tag vector corresponding to the training sample; and performing iteration adjustment on a model parameter of the neural network model according to a result of a comparison between the predicted tag vector and the standard tag vector corresponding to the training sample; and in response to the neural network model meeting a convergence condition, identifying a target neural network model, wherein performing the nonlinear transformation on respective output vectors of the plurality of attention networks comprises:

splicing the respective output vectors of the plurality of attention networks to obtain a first output vector, wherein the first output vector is a vector spliced from the output vectors of the plurality of attention networks;

performing mapping on the first output vector with a first mapping parameter to obtain a second mapped output vector, performing mapping on the first output vector with a second mapping parameter to obtain a third mapped output vector, the second mapping parameter being different from the first mapping parameter;

performing element-wise multiplication on the second mapped output vector and the third mapped output vector to obtain a fourth vector; and obtaining the feature fusion vector corresponding to the plurality of attention networks based on the fourth vector.

2. The method according to claim 1, wherein the obtaining the feature fusion vector corresponding to the plurality of attention networks based on the fourth vector comprises:

performing linear mapping on the fourth vector to obtain the feature fusion vector corresponding to the plurality of attention networks.

3. The method according to claim 1, wherein the obtaining the feature fusion vector corresponding to the plurality of attention networks based on the fourth vector comprises:

fusing the fourth vector and the first output vector to obtain a fifth vector; and performing linear mapping on the fifth vector to obtain the feature fusion vector corresponding to the plurality of attention networks.

4. The method according to claim 3, wherein the fusing the fourth vector and the first output vector to obtain a fifth vector comprises:

sequentially splicing the fourth vector and the first output vector to obtain the fifth vector; or performing element-wise multiplication on the fourth vector and the first output vector to obtain the fifth vector; or performing element-wise addition on the fourth vector and the first output vector to obtain the fifth vector.

5. The method according to claim 1, wherein performing iteration adjustment on a model parameter of the neural network model according to a result of a comparison between the predicted tag vector and the standard tag vector corresponding to the training sample; and in response to the neural network model meeting a convergence condition, identifying a target neural network model comprises:

determining a loss function value according to the result of comparison between the predicted tag vector corresponding to the training sample and the standard tag vector;

performing the iteration adjustment on the model parameter of the neural network model when the loss function value is greater than a target threshold; and when the loss function value is less than or equal to the target threshold, determining that the current neural network model meets the convergence condition, and identifying the current neural network model as the target neural network model.

6. The method according to claim 1, wherein the neural network model is a machine translation model and comprises an encoder and a decoder;

the encoder comprising N cascaded first-type network blocks, and each first-type network block comprising one multi-head attention network layer and one feed-forward neural network layer that are cascaded; and the decoder comprising N cascaded second-type network blocks, each second-type network block comprising two multi-head attention network layers and one feed-forward neural network layer that are cascaded, and N being a positive integer greater than or equal to 1.

7. The method according to claim 1, wherein the training sample is at least one of a to-be-translated text, a to-be-translated video, or a to-be-translated audio, and a standard tag corresponding to the training sample is a standard translated text.

8. A machine translation method, comprising:

obtaining to-be-translated content;

obtaining a translation result corresponding to the to-be-translated content by using a machine translation model, the machine translation model being obtained by performing training according to the model training method comprising:

obtaining a training sample set, the training sample set comprising a training sample and a standard tag vector corresponding to the training sample;

inputting the training sample into a plurality of attention networks of the machine translation model, and performing nonlinear transformation on respective output vectors of the plurality of attention networks;

obtaining a feature fusion vector corresponding to the plurality of attention networks;

obtaining a predicted tag vector outputted by the machine translation model according to the feature fusion vector, the predicted tag vector corresponding to the training sample;

performing iteration adjustment on a model parameter of the machine translation model according to a result of a comparison between the predicted tag vector and the standard tag vector corresponding to the training sample; and in response to the neural network model meeting a convergence condition, identifying the machine translation model; and displaying the translation result, wherein performing the nonlinear transformation on respective output vectors of the plurality of attention networks comprises:

splicing the respective output vectors of the plurality of attention networks to obtain a first output vector, wherein the first output vector is a vector spliced from the output vectors of the plurality of attention networks;

performing mapping on the first output vector with a first mapping parameter to obtain a second mapped output vector;

performing mapping on the first output vector with a second mapping parameter to obtain a third mapped output vector, the second mapping parameter being different from the first mapping parameter;

performing element-wise multiplication on the second mapped output vector and the third mapped output vector to obtain a fourth vector; and obtaining the feature fusion vector corresponding to the plurality of attention networks based on the fourth vector.

9. The method according to claim 8, wherein the training sample is at least one of a to-be-translated text, a to-be-translated video, or a to-be-translated audio, and a standard tag corresponding to the training sample is a standard translated text.

10. A computer device, comprising a processor and a memory;
the memory being configured to store program code executable by the processor; and
the processor being configured to execute the program code and perform a plurality of operations comprising:
obtaining a training sample set, the training sample set comprising a training sample and a standard tag vector corresponding to the training sample;
inputting the training sample in the training sample set into a plurality of attention networks of a neural network model, and performing nonlinear transformation on respective output vectors of the plurality of attention networks by using the neural network model, to obtain a feature fusion vector corresponding to the plurality of attention networks;
obtaining a predicted tag vector outputted by the neural network model according to the feature fusion vector, the predicted tag vector corresponding to the training sample; and
performing iteration adjustment on a model parameter of the neural network model according to a result of comparison between the predicted tag vector corresponding to the training sample and the standard tag vector;
in response to the neural network model meeting a convergence condition, identifying a target neural network model,
wherein performing the nonlinear transformation on respective output vectors of the plurality of attention networks comprises:
splicing the respective output vectors of the plurality of attention networks to obtain a first output vector, wherein the first output vector is a vector spliced from the output vectors of the plurality of attention networks;
performing mapping on the first output vector with a first mapping parameter to obtain a second mapped output vector,
performing mapping on the first output vector with a second mapping parameter to obtain a third mapped output vector, the second mapping parameter being different from the first mapping parameter;
performing element-wise multiplication on the second mapped output vector and the third mapped output vector to obtain a fourth vector; and
obtaining the feature fusion vector corresponding to the plurality of attention networks based on the fourth vector.

11. The computer device according to claim 10, wherein the processor is configured to execute the program code and perform a plurality of operations further comprising:
performing linear mapping on the fourth vector to obtain the feature fusion vector corresponding to the plurality of attention networks.

12. The computer device according to claim 10, wherein the processor is configured to execute the program code and perform a plurality of operations further comprising:
fusing the fourth vector and the first output vector to obtain a fifth vector; and
performing linear mapping on the fifth vector to obtain the feature fusion vector corresponding to the plurality of attention networks.

13. The computer device according to claim 12, wherein the processor is configured to execute the program code and perform a plurality of operations further comprising:
sequentially splicing the fourth vector and the first output vector to obtain the fifth vector; or
performing element-wise multiplication on the fourth vector and the first output vector to obtain the fifth vector; or
performing element-wise addition on the fourth vector and the first output vector to obtain the fifth vector.

14. The computer device according to claim 10, wherein the processor is configured to execute the program code and perform a plurality of operations further comprising:
determining a loss function value according to the result of comparison between the predicted tag vector corresponding to the training sample and the standard tag vector;
performing the iteration adjustment on the model parameter of the neural network model when the loss function value is greater than a target threshold; and
when the loss function value is less than or equal to the target threshold, determining that the current neural network model meets the convergence condition, and using the current neural network model as the target neural network model.

15. The computer device according to claim 10, wherein the neural network model is a machine translation model and comprises an encoder and a decoder;
the encoder comprising N cascaded first-type network blocks, and each first-type network block comprising one multi-head attention network layer and one feed-forward neural network layer that are cascaded; and
the decoder comprising N cascaded second-type network blocks, each second-type network block comprising two multi-head attention network layers and one feed-forward neural network layer that are cascaded, and N being a positive integer greater than or equal to 1.

16. A non-transitory computer readable storage medium storing computer instructions that, when being executed by a processor, cause the processor to perform the method according to claim 1.

* * * * *